United States Patent
Hendry et al.

(10) Patent No.: US 12,445,638 B2
(45) Date of Patent: Oct. 14, 2025

(54) IMAGE CODING METHOD BASED ON POC INFORMATION AND NON-REFERENCE PICTURE FLAG IN VIDEO OR IMAGE CODING SYSTEM

(71) Applicant: LG Electronics Inc., Seoul (KR)

(72) Inventors: Hendry Hendry, Seoul (KR); Hyeongmoon Jang, Seoul (KR); Junghak Nam, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 17/791,062

(22) PCT Filed: May 24, 2021

(86) PCT No.: PCT/KR2021/006430
§ 371 (c)(1),
(2) Date: Jul. 6, 2022

(87) PCT Pub. No.: WO2021/241963
PCT Pub. Date: Dec. 2, 2021

(65) Prior Publication Data
US 2023/0113358 A1    Apr. 13, 2023

Related U.S. Application Data

(60) Provisional application No. 63/030,853, filed on May 27, 2020.

(51) Int. Cl.
H04N 19/503    (2014.01)
H04N 19/169    (2014.01)
(Continued)

(52) U.S. Cl.
CPC ......... *H04N 19/503* (2014.11); *H04N 19/172* (2014.11); *H04N 19/188* (2014.11); *H04N 19/46* (2014.11)

(58) Field of Classification Search
CPC .. H04N 19/503; H04N 19/172; H04N 19/188; H04N 19/46
See application file for complete search history.

(56) References Cited

U.S. PATENT DOCUMENTS

2015/0326866 A1* 11/2015 Ikai ............... H04N 19/174
                                                              375/240.25
2022/0038685 A1*  2/2022 Deshpande ........... H04N 19/58
(Continued)

FOREIGN PATENT DOCUMENTS

| KR | 101658324   | 9/2016 |
|----|-------------|--------|
| KR | 20170023009 | 3/2017 |
| KR | 20200008042 | 1/2020 |

OTHER PUBLICATIONS

Bross et al., "Versatile Video Coding (Draft 9)," Joint Video Experts Team (JVET) of ITU-T SG 16 WP 3 and ISO/IEC JTC 1/SC 29/WG 11, Document: JVET-R2001-vA, 18th Meeting: by teleconference, Apr. 15-24, 2020, 524 pages.
(Continued)

*Primary Examiner* — Kyle M Lotfi
(74) *Attorney, Agent, or Firm* — Fish & Richardson P.C.

(57) ABSTRACT

According to the disclosure of the present document, image information acquired via a bitstream includes POC information, and a non-reference picture flag related to whether a picture is not used as a reference picture. A POC value of a current picture is derived on the basis of the POC information, and the POC information includes POC information of a previous picture in decoding order for the current picture. The previous picture in the decoding order for deriving the POC value of the current picture may be limited (Continued)

to a picture where a value of the non-reference picture flag is 0. Accordingly, an incorrect POC value can be prevented from being derived in video/image coding.

15 Claims, 14 Drawing Sheets

(51) Int. Cl.
*H04N 19/172* (2014.01)
*H04N 19/46* (2014.01)

(56) References Cited

U.S. PATENT DOCUMENTS

| | | | |
|---|---|---|---|
| 2023/0077443 A1* | 3/2023 | Wang | H04N 19/188 375/240.26 |
| 2023/0232030 A1* | 7/2023 | Wang | H04N 19/188 375/240.26 |

OTHER PUBLICATIONS

Hendry et al., "AHG9: On non-referenced picture and POC derivation," Joint Video Experts Team (JVET) of ITU-T SG 16 WP 3 and ISO/IEC JTC 1/SC 29/WG 11, Document: JVET-S0081, 19th Meeting: by teleconference, Jun. 22-Jul. 1, 2020, 3 pages.

* cited by examiner

IMAGE CODING METHOD BASED ON POC INFORMATION AND NON-REFERENCE PICTURE FLAG IN VIDEO OR IMAGE CODING SYSTEM

CROSS-REFERENCE TO RELATED APPLICATIONS

This application is a National Stage application under 35 U.S.C. § 371 of International Application No. PCT/KR2021/006430, filed on May 24, 2021, which claims the benefit of U.S. Provisional Application No. 63/030,853, filed on May 27, 2020. The disclosures of the prior applications are hereby incorporated by reference herein in their entirety.

BACKGROUND OF THE DISCLOSURE

Field of the Disclosure

The present disclosure relates to video/image coding technology, and more particularly, to an image coding method based on picture order count (POC) information and a non-reference picture flag in a video or image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An exemplary embodiment of the present disclosure provides a method and an apparatus for enhancing video/image coding efficiency.

An exemplary embodiment of the present disclosure provides a method and an apparatus for signaling picture order count (POC) information.

An exemplary embodiment of the present disclosure provides a method and an apparatus for signaling a non-reference picture flag related to whether a picture is not used as a reference picture.

An exemplary embodiment of the present disclosure provides a method and an apparatus for deriving a previous picture in a decoding order for deriving a POC value of a current picture based on a non-reference picture flag.

An exemplary embodiment of the present disclosure provides a method and an apparatus for deriving a previous picture in a decoding order for deriving a POC value of a current picture based on MaxPicOrderCntLsb.

An exemplary embodiment of the present disclosure provides a video/image decoding method performed by a decoding apparatus.

An exemplary embodiment of the present disclosure provides a decoding apparatus for performing a video/image decoding.

An exemplary embodiment of the present disclosure provides a video/image encoding method performed by an encoding apparatus.

An exemplary embodiment of the present disclosure provides an encoding apparatus for performing video/image encoding.

An exemplary embodiment of the present disclosure provides a computer readable digital storage medium in which encoded video/image information generated by the vide/image encoding method disclosed in at least one of the exemplary embodiments of the present disclosure is stored.

An exemplary embodiment of the present disclosure provides a computer readable digital storage medium in which encoded information or encoded video/image information causing the vide/image decoding method disclosed in at least one of the exemplary embodiments of the present disclosure to be performed by the decoding apparatus is stored.

Advantageous Effects

The exemplary embodiment of the present disclosure may enhance the overall image/video compression efficiency.

The exemplary embodiment of the present disclosure may signal picture order count (POC) information.

The exemplary embodiment of the present disclosure may signal a non-reference picture flag related to whether a picture is not used as a reference picture.

The exemplary embodiment of the present disclosure may derive a previous picture in a decoding order for deriving a POC value of a current picture based on a non-reference picture flag.

The exemplary embodiment of the present disclosure may derive a previous picture in a decoding order for deriving a POC value of a current picture based on MaxPicOrderCntLsb.

DESCRIPTION OF EXEMPLARY EMBODIMENTS

Figure 1:
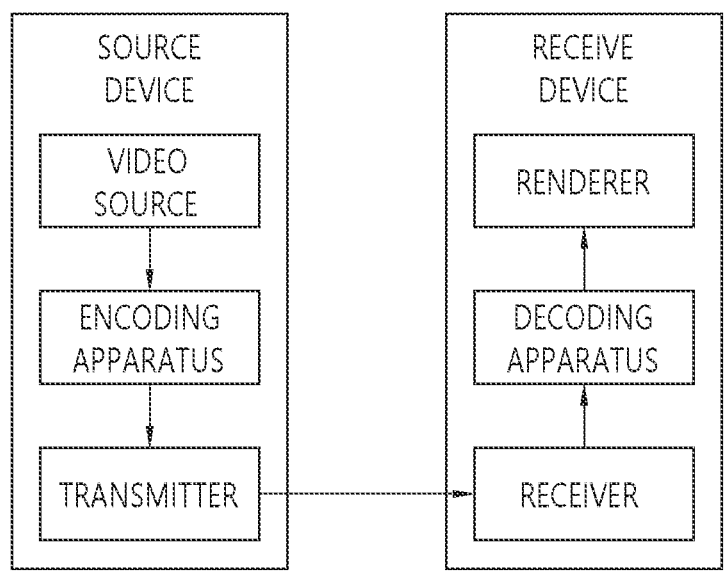
FIG. 1 schematically illustrates an example of a video/image coding system to which exemplary embodiments of the present disclosure are applicable.

The present disclosure may be modified in various forms, and specific embodiments thereof will be described and shown in the drawings. However, the embodiments are not intended for limiting the present disclosure. The terms used in the following description are used to merely describe specific embodiments, but are not intended to limit the present disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of presence or addition of one or more different features, numbers, steps, operations, elements, components, or combinations thereof is not excluded.

Meanwhile, each of the components in the drawings described in the present disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of the present disclosure without departing from the spirit of the present disclosure.

Hereinafter, exemplary embodiments of the present disclosure will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present disclosure are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to a video/image coding. For example, methods/exemplary embodiments disclosed in the present disclosure are applicable to a method disclosed in a versatile video coding (VVC) standard. Further, the methods/exemplary embodiments disclosed in the present disclosure are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

The present disclosure presents various embodiments of video/image coding, and the embodiments may be performed in combination with each other unless otherwise mentioned.

In the present disclosure, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B", or "both A and B". In other words, in the present disclosure, "A or B" may be interpreted as "A and/or B". For example, in the present disclosure, "A, B, or C" may mean "only A", "only B", "only C", or "any combination of A, B, and C".

A slash (/) or a comma used in the present disclosure may mean "and/or". For example, "A/B" may mean "A and/or B". Therefore, "A/B" may mean "only A", "only B", or "both A and B". For example, "A, B, C" may mean "A, B, or C".

In the present disclosure, "at least one of A and B" may mean "only A", "only B", or "both A and B". Further, in the present disclosure, expressions of "at least one of A or B" or "at least one of A and/or B" may be interpreted the same as "at least one of A and B".

Further, in the present disclosure, "at least one of A, B, and C" may mean "only A", "only B", "only C", or "any combination of A, B, and C". Further, "at least one of A, B, or C" or "at least one of A, B, and/or C" may mean "at least one of A, B, and C".

Further, a parenthesis used in the present disclosure may mean "for example". Specifically, if it is indicated by a "prediction (intra prediction)", an "intra prediction" may be proposed as an example of the "prediction". In other words, the "prediction" in the present disclosure is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present disclosure, a technical feature individually described in one drawing may also be individually implemented, and also be simultaneously implemented.

Figure 2:
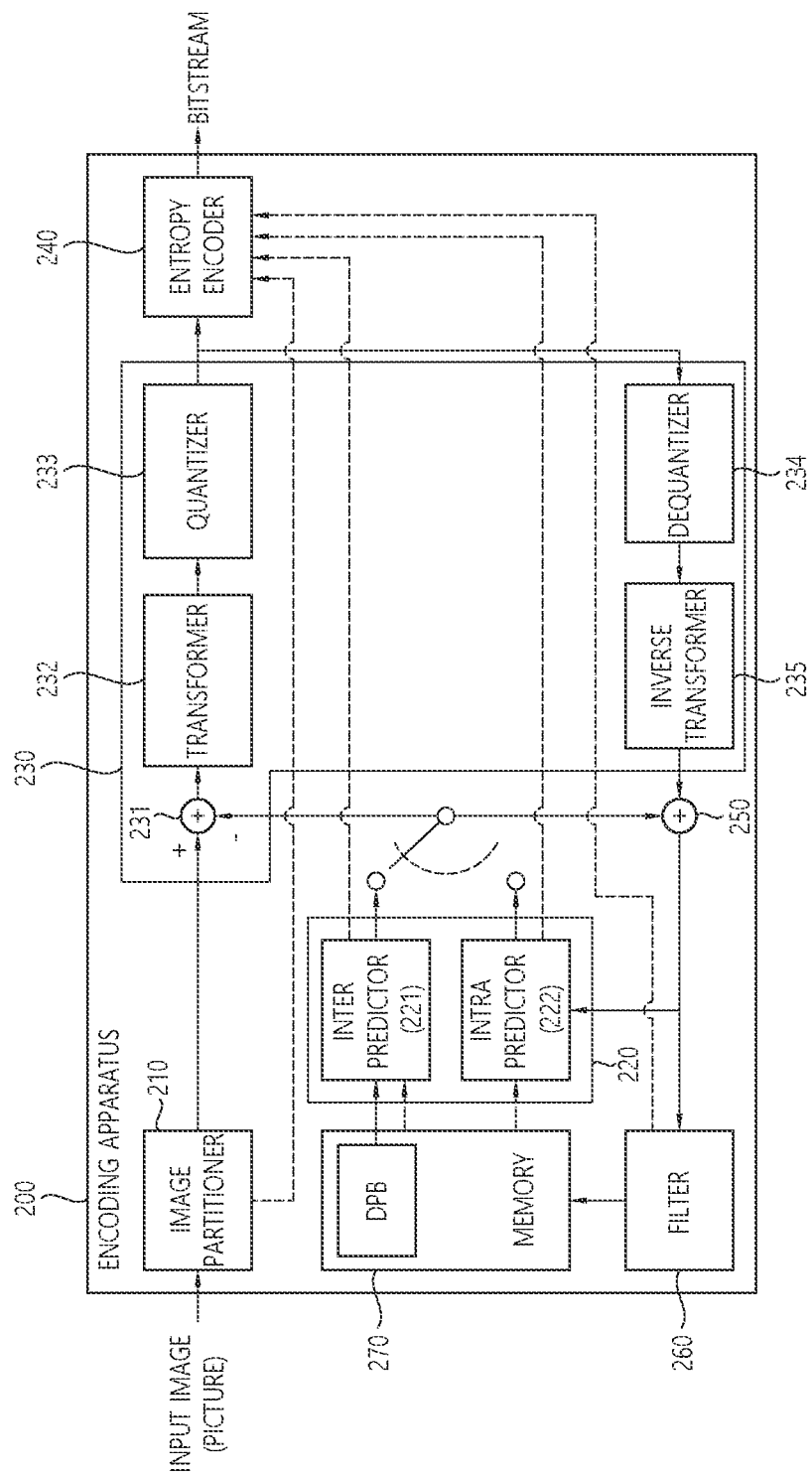
FIG. 2 is a diagram for schematically explaining a configuration of a video/image encoding apparatus to which the exemplary embodiments of the present disclosure are applicable.

FIG. 2 is a diagram for schematically explaining a configuration of a video/image encoding apparatus to which exemplary embodiments of the present disclosure are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
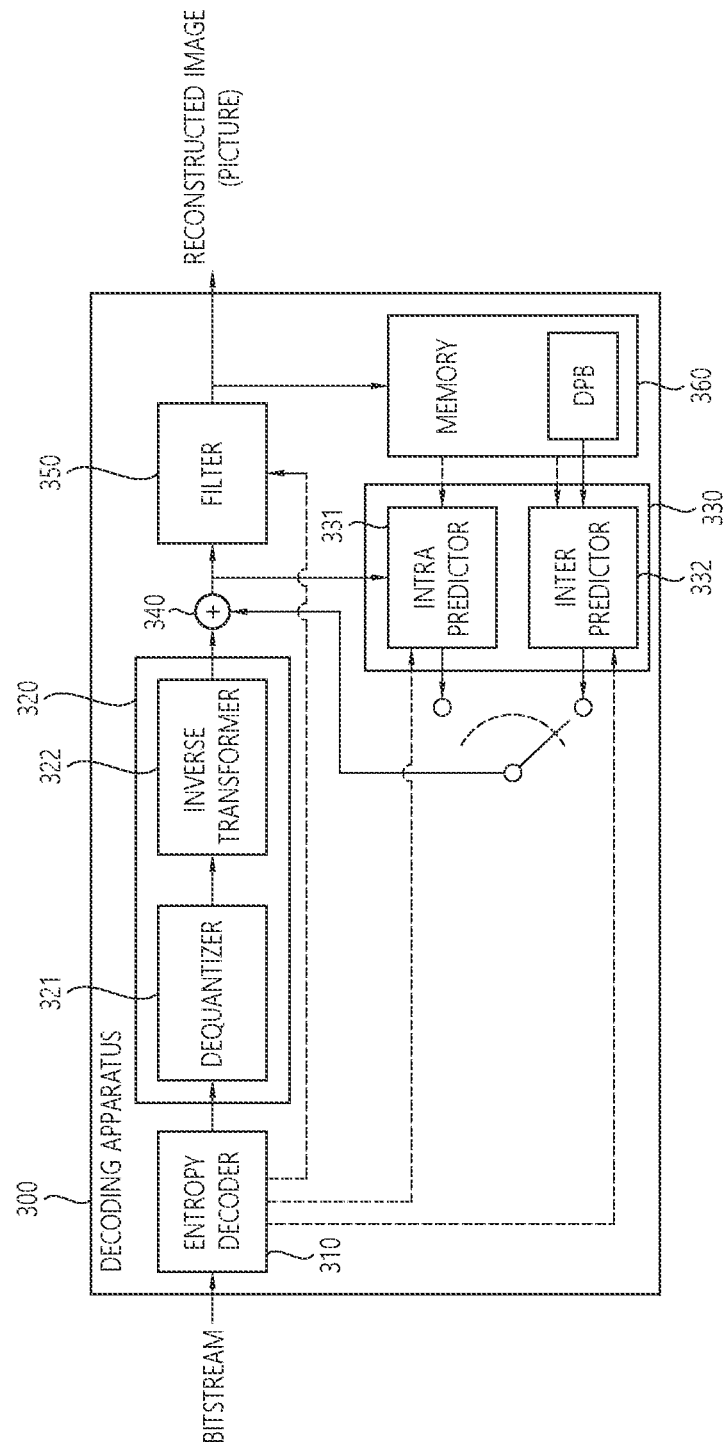
FIG. 3 is a diagram for schematically explaining a configuration of a video/image decoding apparatus to which the exemplary embodiments of the present disclosure are applicable.

FIG. 3 is a diagram schematically explaining a configuration of a video/image decoding apparatus to which exemplary embodiments of the present disclosure are applicable.

Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/ bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present disclosure, at least one of the quantization/the dequantization and/or the transform/the inverse transform may be omitted. If the quantization/dequantization are omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present disclosure, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present disclosure.

Figure 4:
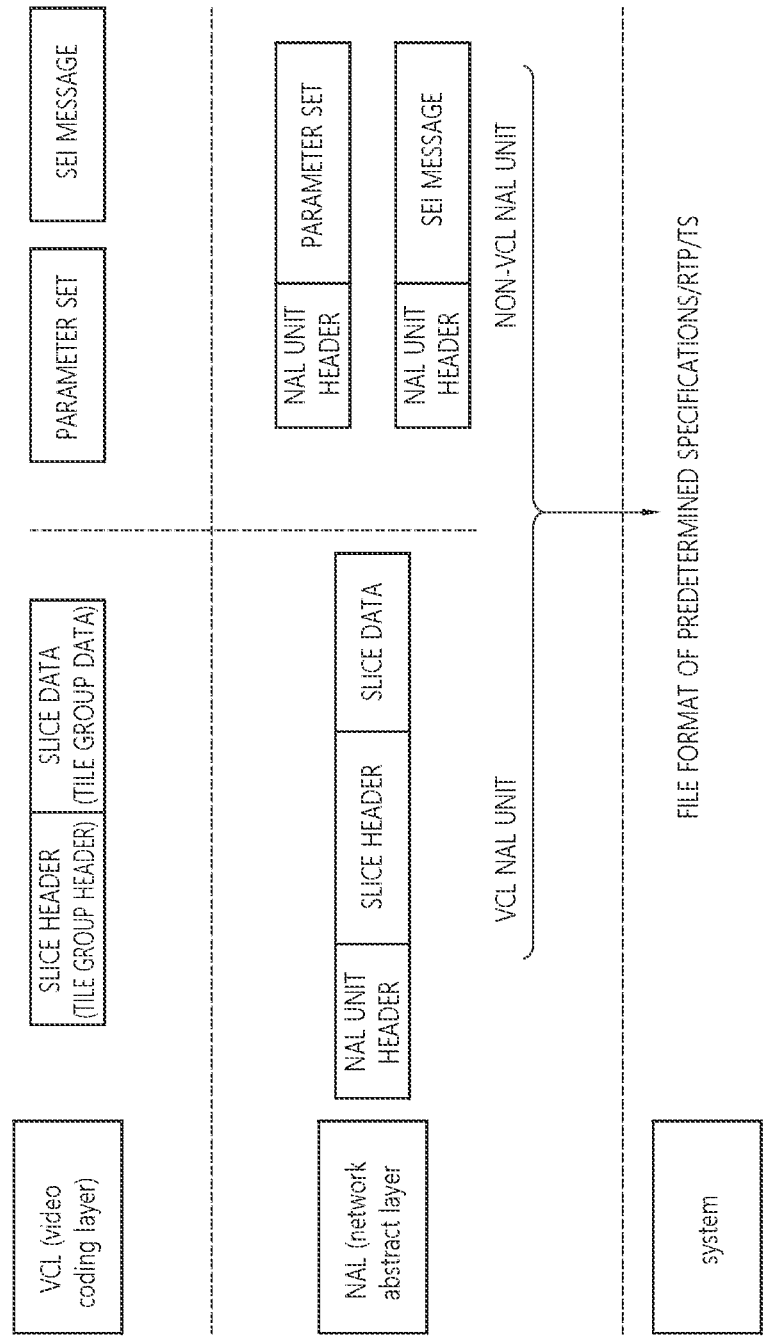
FIG. 4 exemplarily illustrates a hierarchical structure for the coded video/image.

FIG. 4 exemplarily illustrates a hierarchical structure for the coded video/image.

Referring to FIG. 4, the coded video/image may be classified into a video coding layer (VCL) which deals with a decoding processing of videos/images and themselves, a subsystem for transmitting and storing encoded information, and a network abstraction layer which exists between the VCL and the subsystem and is in charge of a network adaption function.

For example, in the VCL, VCL data including compressed image data (slice data) may be generated or a parameter set including a picture parameter set (PPS), a sequence parameter set (SPS), a video parameter set (VPS), or a supplemental enhancement information (SEI) message additionally necessary for the image decoding process may be generated.

Further, for example, in the NAL, an NAL unit may be generated by adding header information (NAL unit header) to a raw byte sequence payload (RBSP) generated in the VCL. In this case, the RBSP may refer to the slice data, parameter set, and SEI message generated in the VCL. The NAL unit header may include NAL unit type information designated according to the RBSP data included in the corresponding NAL unit.

Further, for example, as illustrated in FIG. 4, the NAL unit may be classified into a VCL NAL unit and a non-VCL NAL unit according to the RBSP generated in the VCL. The VCL NAL unit may mean the NAL unit including information about the image (slice data), and the non-VCL NAL unit may mean the NAL unit including information necessary for the image decoding (parameter set or SEI message).

The aforementioned VCL NAL unit and non-VCL NAL unit may be transmitted through a network by attaching header information according to a data standard of the subsystem. For example, the NAL unit may be transformed into a predetermined data format of the standard, such as H.266/VVC file format, a real-time transport protocol (RTP), or a transport stream (TS), and transmitted through various networks.

Further, as described above, a NAL unit type may designated for the NAL unit according to a data structure of the RBSP included in the corresponding NAL unit, and the information about the NAL unit type may be stored in and signaled to the NAL unit header.

For example, the NAL unit may be classified into a VCL NAL unit type and a non-VCL NAL unit type according to whether to include the information about the image (slice data). Further, the VCL NAL unit type may be classified according to the property and type of picture included in the VCL NAL unit, and the non-VCL NAL unit type may be classified according to the type of parameter set.

The following description may be an example of the NAL unit type designated according to the type of parameter set included in the non-VCL NAL unit type.

An adaptation parameter set (APS) NAL unit: Type for the NAL unit including the APS A decoding parameter set (DPS) NAL unit: Type for the NAL unit including the DPS A video parameter set (VPS) NAL unit: Type for the NAL unit including the VPS A sequence parameter set (SPS) NAL unit: Type for the NAL unit including the SPS A picture parameter set (PPS) NAL unit: Type for the NAL unit including the PPS A picture header (PH) NAL unit: Type for the NAL unit including the PH The aforementioned NAL unit types may have syntax information about the NAL unit type, and the syntax information may be stored in and signaled to the NAL unit header. For example, the syntax information may be nal_unit_type, and the NAL unit type may be designated as a value of the nal_unit_type.

Meanwhile, as described above, one picture may include a plurality of slices, and the slice may include a slice header and a slice data. In this case, one picture header may be added to (embedded in) the plurality of slices (a set of the slice header and the slice data). The picture header (picture header syntax) may include information/parameters commonly applicable to the picture. The slice header (slice header syntax) may include information/parameters commonly applicable to the slice. The APS (APS syntax) or the PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to a plurality of layers. The DPS (DPS syntax) may include information/parameters commonly applicable to the entire image. The DPS may include information/parameters related to the concatenation of a coded video sequence (CVS). In the present disclosure, a high level syntax (HLS) may include at least one of the APS syntax, the PPS syntax, the SPS syntax, the VPS syntax, the DPS syntax, the picture header syntax, and the slice header syntax.

Meanwhile, as described above, one NAL unit type may be generally set for one picture, and as described above, the NAL unit type may be signaled through the nal_unit_type in the NAL unit header of the NAL unit including the slice. The following Table expresses an example of NAL unit type codes an NAL unit type classes.

TABLE 1

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1* | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4_ RSV_VCL_6 | Reserved non-IRAP VCL NAL unit types | VCL |
| 7 | IDR_W_RADL | Coded slice of an IDR picture slice_layer_rbsp( ) | VCL |
| 8 | IDR_N_LP | | |
| 9 | CRA_NUT | Coded slice of a CBA picture slice_layer_rbsp( ) | VCL |
| 10 | GDR_NUT | Coded slice of a GDR picture slice_layer_rbsp( ) | VCL |
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28_ UNSPEC_31 | Unspecified non-VCL NAL unit types | non-VCL |

In this regard, a clean random access (CRA) picture may be related to a random access skipped leading (RASL) picture or a random access decodable leading (RADL) picture, which exists in a bitstream. An instantaneous decoding refresh (IDR) picture with the same nal_unit_type as that of the variable IDR_N_LP does not have a related leading picture in the bitstream. In other words, the IDR picture with the same nal_unit_type as that of the variable IDR_W_RADL does not have a related RASL picture in the bitstream, but may have a related RADL picture. The IDR picture is an IRAP picture in which each VCL NAL unit has the same nal_unit_type as that of the IDRA_W_RADL or the IDR_N_LP.

In performing the decoding procedure, the IDR picture does not use the inter prediction and may be a picture whose decoding order in the bitstream is first. Alternatively, the IDR picture may appear in the bitstream later. Each IDR picture may be a picture whose decoding order in the CVS may be first. The IDR picture in which each VCL NAL unit has the same nal_unit_type as that of the IDR_W_RADL may have the related RADL picture. The IDR picture in which each VCL NAL unit has the same nal_unit_type as that of the IDR_N_LP does not have the related leading picture. In other words, the IDR picture does not have the related RASL pictures.

In the present disclosure, the video/image information encoded from the encoding apparatus to the decoding apparatus and signaled in the form of the bitstream may include information included in the slice header, information included in the picture header, information included in the APS, information included in the PPS, information included in the SPS, information included in the VPS, and/or information included in the DPS as well as partitioning-related information in the picture, intra/inter prediction information, residual information, and in-loop filtering information. Further, the video/image information may further include information of the NAL unit header.

Meanwhile, a bitstream (or temporal scalable bitstream) supporting temporal scalability includes information on a temporally scaled temporal layer. The information on the temporal layer may be identification information of a temporal layer specified according to the temporal scalability of an NAL unit. For example, temporal_id syntax information may be used for temporal layer identification information, and the temporal_id syntax information may be stored in a NAL unit header in an encoding apparatus and signaled to a decoding apparatus. Hereinafter, in the present disclosure, the temporal layer may also be referred to as a sub-layer, a temporal sub-layer, or a temporal scalable layer.

Figure 5:
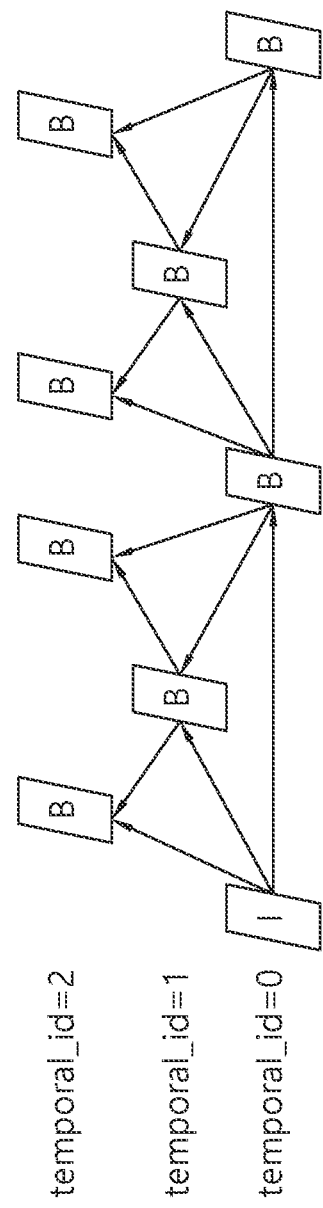
FIG. 5 is a diagram illustrating a temporal layer structure for NAL units in a bitstream supporting temporal scalability.

FIG. 5 is a diagram illustrating a temporal layer structure for NAL units in a bitstream supporting temporal scalability.

When the bitstream supports temporal scalability, NAL units included in the bitstream have identification information (e.g., temporal_id) of a temporal layer. As an example, a temporal layer including NAL units having a temporal_id value of 0 may provide the lowest temporal scalability, and a temporal layer including NAL units having a temporal_id value of 2 may provide the highest temporal scalability.

In FIG. 5, a box marked with I refers to an I picture, and a box marked with B refers to a B picture. In addition, arrows indicate a reference relationship with respect to whether a picture refers to another picture.

As shown in FIG. 5, NAL units of a temporal layer having a temporal_id value of 0 are reference pictures that may be referenced by NAL units of a temporal layer having a temporal_id value of 0, 1, or 2. NAL units of a temporal layer having a temporal_id value of 1 are reference pictures that may be referenced by NAL units of a temporal layer having a temporal_id value of 1 or 2. NAL units of a temporal layer having a temporal_id value of 2 may be reference pictures that may be referenced by NAL units of the same temporal layer, that is, a temporal layer having a temporal_id value of 2, or may be non-reference pictures that are not referenced by other pictures.

If, as shown in FIG. 5, NAL units of a temporal layer having a temporal id value of 2, that is, the uppermost temporal layer, are non-reference pictures, these NAL units may be extracted (or removed) from a bitstream without affecting other pictures in a decoding process.

If the inter prediction is applied, the predictors of the encoding apparatus/the decoding apparatus may derive the prediction samples by performing the inter prediction in units of block. The inter prediction may be a prediction derived in a manner that is dependent on data elements (e.g., sample values or motion information) of the picture(s) other than the current picture. If the inter prediction is applied to the current block, a predicted block (prediction sample array) for the current block may be induced based on a reference block (reference sample array) specified by the motion vector on the reference picture indicated by the reference picture index. At this time, to reduce an amount of the motion information transmitted in the inter prediction mode, the motion information of the current block may be predicted in units of block, subblock, or sample based on the correlation of the motion information between the neighboring block and the current block. The motion information may include the motion vector and the reference picture index. The motion information may further include inter prediction type (L0 prediction, L1 prediction, and Bi prediction) information. If the inter prediction is applied, the neighboring block may include a spatial neighboring block existing in the current picture and a temporal neighboring block existing in the reference picture. The reference picture including the reference block and the reference picture including the temporal neighboring block may also be the same, and also be different. The temporal neighboring block may be referred to as a collocated reference block or a collocated CU (colCU), and the reference picture including the temporal neighboring block may be referred to as a collocated picture (colPic). For example, a motion information candidate list may be constituted based on the neighboring blocks of the current block, and a flag or index information indicating which candidate is selected (used) to derive the motion vector of the current block and/or the reference picture index may be signaled. The inter prediction may be performed based on various prediction modes, and for example, in the skip mode and the merge mode, the motion information of the current block may be the same as the motion information of the selected neighboring block. In the skip mode, the residual signal may not be transmitted unlike in the merge mode. In the motion vector prediction (MVP) mode, the motion vector of the selected neighboring block may be used as a motion vector predictor, and a motion vector difference may be signaled. In this case, the motion vector of the current block may be derived by using the sum of the motion vector predictor and the motion vector difference.

The motion information may include L0 motion information and/or L1 motion information according to the inter prediction types (L0 prediction, L1 prediction, and Bi prediction). A motion vector in an L0 direction may be referred to as an L0 motion vector or an MVL0, and a motion vector in an L1 direction may be referred to as an L1 motion vector or an MVL1. A prediction based on the L0 motion vector may be referred to as the L0 prediction, a prediction based on the L1 motion vector may be referred to as the L1 prediction, and a prediction based on both the L0 motion vector and the L1 motion vector may be referred to as the Bi prediction. Here, the L0 motion vector may refer to a motion vector associated with a reference picture list L0 (L0), and the L1 motion vector may refer to a motion vector associated with a reference picture list L1 (L1). The reference picture list L0 may include pre-pictures of the current picture on the output order as the reference pictures, and the reference picture list L1 may include post-pictures of the current picture on the output order. The pre-pictures may be referred to as a forward (reference) picture, and the post-pictures may be referred to as a backward (reference) picture. The reference picture list L0 may further include the post-pictures of the current picture as the reference pictures on the output order. In this case, in the reference picture list L0, the pre-pictures may be first indexed and then the post-pictures may be indexed. The reference picture list L1 may further include the pre-pictures of the current picture on the output order as the reference pictures. In this case, in the reference picture list L1, the post-pictures may be first indexed and then the pre-pictures may be indexed. Here, the output order may correspond to a picture order count (POC) order.

A video/image encoding procedure based on the inter prediction may schematically include the following description, for example.

Figure 6:
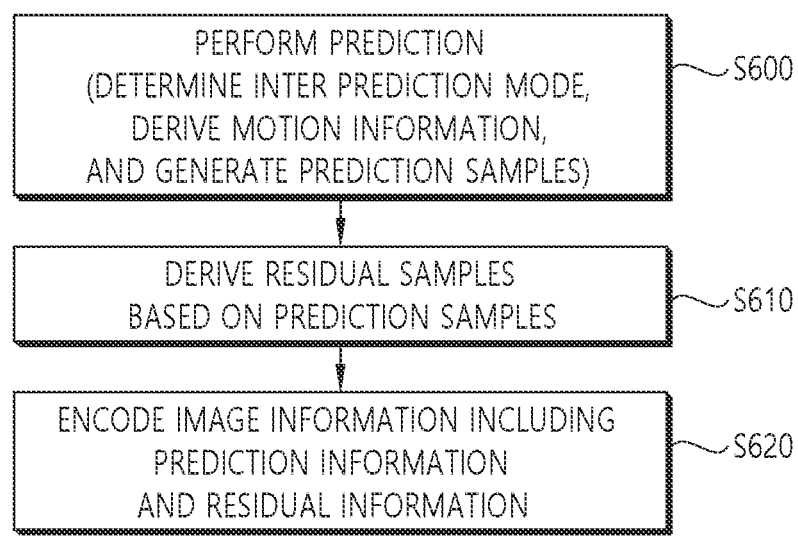
FIG. 6 shows a video/image encoding method based on inter prediction.

FIG. 6 illustrate a video/image encoding method based on the inter prediction.

Referring to FIG. 6, the encoding apparatus performs inter prediction for a current block (S600). The encoding apparatus may derive an inter prediction mode and motion information of the current block and generate prediction samples of the current block. Here, procedures of determining the inter prediction mode, deriving the motion information, and generating the prediction samples may also be simultaneously performed, and any one procedure may also be performed prior to other procedures. For example, the inter predictor of the encoding apparatus may include a prediction mode determination unit, a motion information derivation unit, and a prediction sample derivation unit, in which the prediction mode determination unit may determine the prediction mode for the current block, the motion information derivation unit may derive the motion information of the current block, and the prediction sample derivation unit may derive the prediction samples of the current block. For example, the inter predictor of the encoding apparatus may search for a block similar to the current block in a certain region (search region) of the reference pictures through motion estimation and derive a reference block in which a difference with the current block is minimum or a certain standard or less. Based on the above, the reference picture index indicating the reference picture at which the reference block is located may be derived, and the motion vector may be derived based on a difference between locations of the reference block and the current block. The encoding apparatus may determine a mode applied to the current block among various prediction modes. The encoding apparatus may compare RD costs for various prediction modes and determine an optimal prediction mode for the current block.

For example, if the skip mode or the merge mode is applied to the current block, the encoding apparatus may constitute a merge candidate list to be described later and derive a reference block in which a difference with the current block is minimum or a certain standard or less among the reference blocks indicated by merge candidates included in the merge candidate list. In this case, the merge candidate associated with the derived reference block may be selected, and the merge index information indicating the selected merge candidate may be generated to be signaled to the decoding apparatus. The motion information of the current block may be derived by using the motion information of the selected merge candidate.

As another example, if the (A)MVP mode is applied to the current block, the encoding apparatus may constitute an (A)MVP candidate list to be described later and use the motion vector of the selected mvp candidate among the motion vector predictor (mvp) candidates included in the (A)MVP candidate list as an mvp of the current block. In this case, for example, the motion vector indicating the reference block derived by the aforementioned motion estimation may be used as the motion vector of the current block, and an mvp candidate having the motion vector having the smallest difference with the motion vector of the current block among the mvp candidates may become the selected mvp candidate. The motion vector difference (MVD), which is a difference obtained by subtracting the mvp from the motion vector of the current block, may be derived. In this case, information about the MVD may be signaled to the decoding apparatus. Further, if the (A)MVP mode is applied, a value of the reference picture index may be composed of reference picture index information and separately signaled to the decoding apparatus.

The encoding apparatus may derive residual samples based on the prediction samples (S610). The encoding apparatus may derive the residual samples through a comparison between original samples and the prediction samples of the current block.

The encoding apparatus encodes image information including prediction information and residual information (S620). The encoding apparatus may output the encoded image information in the form of a bitstream. The prediction information as information related to the prediction procedure may include information about the prediction mode information (e.g., a skip flag, a merge flag, or a mode index) and the motion information. The information about the motion information may include candidate selection information (e.g., a merge index, an mvp flag, or an mvp index), which is information for deriving the motion vector. Further, the information about the motion information may include the aforementioned information about the MVD and/or reference picture index information. Further, the information about the motion information may include information representing whether L0 prediction, L1 prediction, or B1 prediction is applied. The residual information is information about the residual samples. The residual information may include information about quantized transform coefficients for the residual samples.

The output bitstream may be stored in a (digital) storage medium and delivered to the decoding apparatus, or also be delivered to the decoding apparatus through a network.

Meanwhile, as described above, the encoding apparatus may generate a reconstructed picture (including reconstructed samples and a reconstructed block) based on the reference samples and the residual samples. This is to derive the same prediction result as that obtained by being performed by the decoding apparatus in the encoding apparatus, and as a result, it is possible to enhance coding efficiency. Therefore, the encoding apparatus may store the reconstructed picture (or the reconstructed samples and the reconstructed block) in a memory and use the reconstructed picture as the reference picture for the inter prediction. As described above, the in-loop filtering procedure or the like may be further applied to the reconstructed picture.

The video/image decoding procedure based on the inter prediction may schematically include the following description, for example.

Figure 7:
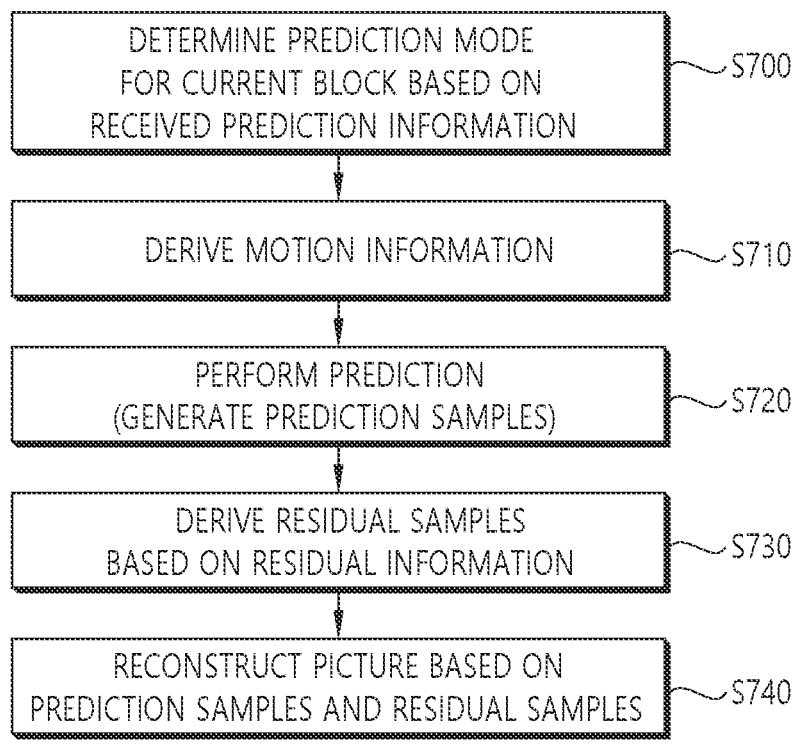
FIG. 7 shows a video/image decoding method based on inter prediction.

FIG. 7 schematically illustrate examples of the video/image decoding method based on the inter prediction and the inter predictor in the decoding apparatus.

Referring to FIG. 7, the decoding apparatus may perform an operation corresponding to the operation performed by the encoding apparatus. The decoding apparatus may perform the prediction for the current block based on the received prediction information and derive the prediction samples.

Specifically, the decoding apparatus may determine a prediction mode for the current block based on the received prediction information (S700). The decoding apparatus may determine which inter prediction mode is applied to the current block based on the prediction mode information in the prediction information.

For example, the decoding apparatus may determine whether the merge mode is applied to the current block or the (A)MVP mode is applied thereto based on the merge flag. Alternatively, the decoding apparatus may select one of various inter prediction mode candidates based on the mode index. The inter prediction mode candidates may include the skip mode, the merge mode, and/or the (A)MVP mode, or include various inter prediction modes to be described later.

The decoding apparatus derives motion information of the current block based on the determined inter prediction mode (S710). For example, if the skip mode or the merge mode is applied to the current block, the decoding apparatus may constitute a merge candidate list to be described later and select one merge candidate of the merge candidates included in the merge candidate list. The selection may be performed based on the aforementioned selection information (merge index). The motion information of the current block may be derived by using the motion information of the selected merge candidate. The motion information of the selected merge candidate may be used as the motion information of the current block.

As another example, if the (A)MVP mode is applied to the current block, the decoding apparatus may constitute an (A)MVP candidate list to be described later and use a motion vector of a selected mvp candidate among motion vector predictor (mvp) candidates included in the (A)MVP candidate list as an mvp of the current block. The selection may be performed based on the aforementioned selection information (the mvp flag or the mvp index). In this case, an MVD of the current block may be derived based on the information about the MVD, and the motion vector of the current block may be derived based on the mvp and MVD of the current block. Further, the reference picture index of the current block may be derived based on the reference picture index information. The picture indicated by the reference picture index in the reference picture list about the current block may be derived as the reference picture referenced for the inter prediction of the current block.

Meanwhile, as described later, the motion information of the current block may be derived without constituting the candidate list, and in this case, the motion information of the current block may be derived according to a procedure disclosed in the prediction mode to be described later. In this case, the constitution of the candidate list described above may be omitted.

The decoding apparatus may generate prediction samples for the current block based on the motion information of the current block (S720). In this case, the decoding apparatus may derive the reference picture based on the reference picture index of the current block and derive the prediction samples of the current block using the samples of the reference block indicated by the motion vector of the current block on the reference picture. In this case, as described later, a prediction sample filtering procedure for all or some of the prediction samples of the current block may be further performed in some cases.

For example, the inter predictor of the decoding apparatus may include a prediction mode determination unit, a motion information derivation unit, and a prediction sample derivation unit, in which the prediction mode determination unit may determine the prediction mode for the current block based on the received prediction mode information, the motion information derivation unit may derive the motion information (the motion vector and/or the reference picture index) of the current block based on the information about the motion information received by the motion information derivation unit, and the prediction sample derivation unit may derive the prediction samples of the current block.

The decoding apparatus generates residual samples for the current block based on received residual information (S730). The decoding apparatus may generate reconstructed samples for the current block based on the prediction samples and the residual samples and generate a reconstructed picture based on the generated reconstructed samples (S740). Thereafter, the in-loop filtering procedure or the like may be further applied to the reconstructed picture as described above.

As described above, the inter prediction procedure may include determining an inter prediction mode, deriving motion information according to the determined prediction mode, and performing prediction (generating a prediction sample) based on the derived motion information. The inter prediction procedure may be performed by the encoding apparatus and the decoding apparatus as described above.

Meanwhile, in the VVC standard, there is a signaling mechanism that allows a system level entity to know whether any one picture is not used as a reference for other pictures. Through this signaling of information, a system level entity may remove a specific picture (i.e., a picture marked not to be used as a reference for other pictures) in a specific situation. For example, when network congestion occurs, a media-aware network router may delete a network packet carrying a coded bit of a picture that is marked not to be used as a reference for other pictures.

In relation to this, according to an existing embodiment, the picture header may include the syntax of Table 2 below so that whether any one picture is not used as a reference for other pictures may be known. The syntax of Table 2 below may be a part of the picture header.

TABLE 2

| picture_header_structure( ) { | Descriptor |
|---|---|
| ... | |
| ph_non_ref_pic_flag | u(1) |
| ... | |
| } | |

Here, semantics of syntax elements included in the syntax of Table 2 may be expressed, for example, as shown in Table 3 below.

TABLE 3 ph_non_ref_pic_flag equal to 1 specifies the picture associated with the PH is never used as a reference picture.
ph_non_ref_pic_flag equal to 0 specifies the picture associated with the PH may or may not be used as a reference picture.

That is, according to the existing embodiment, the image information obtained through a bitstream may include a non-reference picture flag.

For example, the non-reference picture flag may be related to whether a picture is not used as a reference picture. That is, the non-reference picture flag may indicate whether a picture is not used as a reference picture.

As an example, the non-reference picture flag may be expressed in the form of a ph_non_ref_pic_flag syntax element. For example, the ph_non_ref_pic_flag syntax element may specify whether a picture is not used as a reference picture.

According to the existing embodiment, when the value of the non-reference picture flag is 1, it may indicate that a picture is not used as a reference picture, and when the value of the non-reference picture flag is 0, it may indicate that a picture is used as a reference picture.

Meanwhile, according to the existing embodiment, a process for deriving a POC for a current picture may be as shown in Table 4 below.

TABLE 4

Output of this process is PicOrderCntVal, the picture order count of the current picture.

TABLE 4-continued

Each coded picture is associated with a picture order count variable, denoted as PicOrderCntVal.
If vps_independent_layer_flag[ GeneralLayerIdx[ nuh_layer_id ] ] is equal to 0 and there is a picture p
icA in the current AU in a reference layer of the current layer, PicOrderCntVal is derived to be equ
al to the PicOrderCntVal of picA, and the value of ph_pic_order_cnt_lsb shall be the same in all V
CL NAL units of the current AU. Otherwise, PicOrderCntVal of the current picture is derived as sp
ecified below.
When ph_poc_msb_cycle_present_flag is equal to 0 and the current picture is not a CLVSS (i.e., co
ded layer video sequence start) picture, the variables prevPicOrderCntLsb and prevPicOrderCntMsb ar
e derived as follows:
Let prevTid0Pic be the previous picture in decoding order that has nuh_layer_id equal to the nuh_la
yer_id of the current picture, has TemporalId equal to 0, and is not a RASL or RADL picture.
- The variable prevPicOrderCntLsb is set equal to ph_pic_order_cnt_lsb of prevTid0Pic.
- The variable prevPicOrderCntMsb is set equal to PicOrderCntMsb of prevTid0Pic.
The variable PicOrderCntMsb of the current picture is derived as follows:
- If ph_poc_msb_cycle_present_flag is equal to 1, PicOrderCntMsb is set equal to ph_poc_msb_cycle_val * MaxPicOrderCntLsb.
- Otherwise (ph_poc_msb_cycle_present_flag is equal to 0), if the current picture is a CLVSS picture, PicOrderCntMsb is set equal to 0.
- Otherwise, PicOrderCntMsb is derived as follows:
    if( ( ph_pic_order_cnt_lsb < prevPicOrderCntLsb ) &&
      ( ( prevPicOrderCntLsb − ph_pic_order_cnt_lsb ) >=
      ( MaxPicOrderCntLsb / 2 ) ) )
      PicOrderCntMsb = prevPicOrderCntMsb +     (201)
      MaxPicOrderCntLsb
    else if( ( ph_pic_order_cnt_lsb > prevPicOrderCntLsb ) &&
      ( ( ph_pic_order_cnt_lsb − prevPicOrderCntLsb
      ) > ( MaxPicOrderCntLsb / 2 ) ) )
      PicOrderCntMsb = prevPicOrderCntMsb − MaxPicOrderCntLsb
    else
      PicOrderCntMsb = prevPicOrderCntMsb
PicOrderCntVal is derived as follows:
    PicOrderCntVal = PicOrderCntMsb +     (202)
    ph_pic_order_cnt_lsb
NOTE 1 - All CLVSS pictures for which ph_poc_msb_cycle_val is not present will have PicOrderCntVal equ
al to ph pic order cnt lsb since for those pictures PicOrderCntMsb is set equal to 0.
The value of PicOrderCntVal shall be in the range of $-2^{31}$ to $2^{31} - 1$, inclusive.
In one CVS, the PicOrderCntVal values for any two coded pictures with the same value of nuh_lay
er_id shall not be the same.
All pictures in any particular AU shall have the same value of PicOrderCntVal.
The function PicOrderCnt( picX ) is specified as follows:
    PicOrderCnt( picX ) = PicOrderCntVal of the picture picX     (203)
The function DiffPicOrderCnt( picA, picB ) is specified as follows:
    DiffPicOrderCnt( picA, picB ) = PicOrderCnt( picA ) −     (204)
    PicOrderCnt( picB )
The bitstream shall not contain data that result in values of DiffPicOrderCnt( picA, picB ) used in the
decoding process that are not in the range of $-2^{15}$ to $2^{15} - 1$, inclusive.
  NOTE 2 - Let X be the current picture and Y and Z be two other pictures in the same CVS, Y and Z are
  considered to be in the same output order direction from X when both DiffPicOrderCnt( X, Y ) and DiffPi
cOrderCnt( X, Z ) are positive or both are negative.

That is, the variable PicOrderCntVal may mean a POC value of the current picture.

In this case, for example, when inter-layer prediction is used for the current layer (that is, the value of the syntax element vps_independent_layer_flag is 0), the POC value of the current picture may be derived based on the picture in a current access unit (AU) of the reference layer.

For example, if inter-layer prediction is not used for the current layer (the value of the syntax element vps_independent_layer_flag is 1), the POC value of the current picture may be derived based on a previous picture in a decoding order specified by a variable prevTid0Pic under certain conditions.

Here, the semantics of the syntax elements included in Table 4 may be expressed, for example, as shown in Table 5 below.

TABLE 5 ph_non_reference_picture_flag equal to 1 specifies the picture associated with the PH is never used as a reference picture.
ph_non_reference_picture_flag equal to 0 specifies the picture associated with the PH may or may not be used as a reference picture.
ph_pic_order_cnt_lsb specifies the picture order count modulo MaxPicOrderCntLsb for the current picture. The length of the ph_pic_order_cnt_lsb syntax element is sps_log2_max_pic_order_cnt_lsb_minus4 + 4 bits. The value of the ph_pic_order_cnt_lsb shall be in the range of 0 to MaxPicOrderCntLsb − 1, inclusive.
ph_poc_msb_cycle_present_flag equal to 1 specifies that the syntax element ph_poc_msb_cycle_val is present in the PH.
ph_poc_msb_cycle_present_flag equal to 0 specifies that the syntax element ph_poc_msb_cycle_val is not present in the PH. When vps independent layer flag[ GeneralLayerIdx[ nuh layer id ] ] is equal to 0 and there is a picture in the current AU in a reference layer of the current layer, the value of ph_poc_msb_cycle_present_flag shall be equal to 0.
ph_poc_msb_cycle_val specifies the value of the POC MSB cycle of the current picture. The length of the syntax element ph_poc_msb_cycle_val is sps_poc_msb_cycle_len_minus1 + 1 bits.

According to the existing embodiment, image information obtained through the bitstream may include the non-reference picture flag, layer ID information, POC last significant bit (LSB) information, POC most significant bit (MSB) cycle presence flag, and POC MSB cycle information.

Here, for example, the layer ID information may be related to a layer identifier to which the NAL unit belongs. That is, the layer ID information may indicate/represent a layer identifier to which the NAL unit belongs.

For example, the layer ID information may be expressed in the form of a nuh_layer_id syntax element. For example, the nuh_layer_id syntax element may specify a layer identifier to which a NAL unit belongs.

For example, the POC LSB information may be related to a remainder obtained by dividing a POC value of a picture by MaxPicOrderCntLsb, which is a maximum value of a predetermined POC LSB. That is, the POC LSB information may indicate/represent the remainder obtained by dividing the POC value of a picture by MaxPicOrderCntLsb, which is the maximum value of the predetermined POC LSB.

As an example, the POC LSB information may be expressed in the form of a ph_pic_order_cnt_lsb syntax element. For example, the ph_pic_order_cnt_lsb syntax element may specify a remainder obtained by dividing a POC value of a picture by MaxPicOrderCntLsb which is a maximum value of a predetermined POC LSB.

For example, the POC MSB cycle presence flag may be related to the presence or absence of POC MSB cycle information of the current picture. That is, the POC MSB cycle presence flag may indicate/represent whether POC MSB cycle information of the current picture is present.

As an example, the POC MSB cycle presence flag may be expressed in the form of a phpoc_msb_cycle_present_flag syntax element. For example, the phpoc_msb_cycle_present_flag syntax element may specify whether POC MSB cycle information of the current picture is present.

For example, the POC MSB cycle information may be related to the value of the POC MSB cycle of the current picture. That is, the POC MSB cycle information may indicate/represent the POC MSB cycle value of the current picture.

For example, the POC MSB cycle information may be expressed in the form of a ph_poc_msb_cycle_val syntax element. For example, the ph_poc_msb_cycle_val syntax element may specify a value of the POC MSB cycle of the current picture.

According to the existing embodiment, a POC value (PicOrderCntVal) of the current picture may be derived based on a previous picture in a decoding order specified by the variable prevTid0Pic under certain conditions as described above.

For example, if the value of the POC MSB cycle presence flag is 0 and the current picture is not a coded layer video sequence start (CLVSS) picture, the POC value of the current picture may be derived based on the previous picture in the decoding order specified by prevTid0Pic.

Specifically, for example, the POC value (PicOrderCntVal) of the current picture may be derived by adding a variable PicOrderCntMsb indicating the POC MSB of the current picture and the value of the POC LSB information of the current picture. In this case, for example, the PicOrderCntMsb indicating the POC MSB of the current picture may be derived based on the variable prevPicOrderCntLsb and the variable prevPicOrderCntMsb related to the previous picture in the decoding order specified by prevTid0Pic.

In this case, for example, the variable prevPicOrderCntLsb may be set equal to the value of the POC LSB information for the previous picture in the decoding order specified by prevTid0Pic. Also, the variable prevPicOrderCntMsb may be set equal to the value of the variable PicOrderCntMsb for the previous picture in the decoding order specified by the variable prevTid0Pic.

Also, for example, in the previous picture in the decoding order designated by prevTid0Pic, a value of the layer ID information is the same as a value of the layer ID information for the current picture, a temporal ID (TemporalId) is 0, and it may be limited to pictures other than a random access skipped leading (RADL) picture or a random access decodable leading (RADL) picture.

Here, the temporal ID (TemporalId) may be, for example, identification information of the temporal layer described with reference to FIG. 5.

Meanwhile, the POC value of the current picture may be used to construct a reference picture set (and/or a reference picture list) for picture output and/or inter prediction. Also, for example, decoded pictures may be output according to a POC order.

Figure 8:
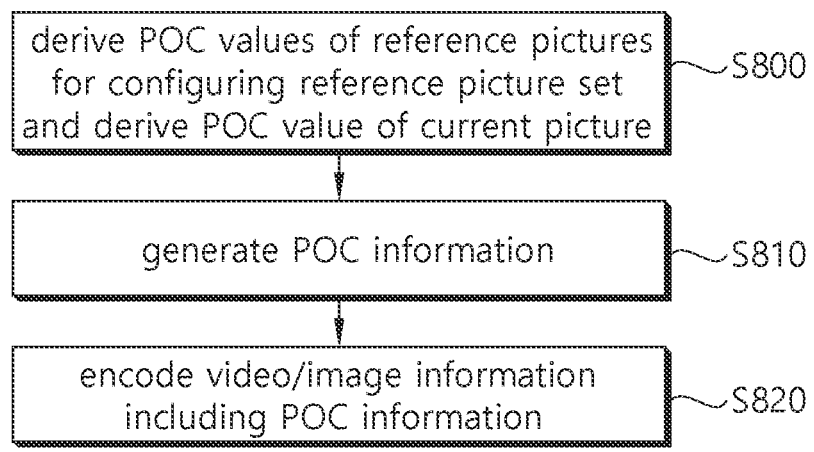
FIG. 8 shows an example of a picture order count (POC)-based video/image encoding method.

FIG. 8 shows an example of a POC-based video/image encoding method. The steps of FIG. 8 may be applied to the embodiment(s) disclosed in the present disclosure. Alternatively, the steps of FIG. 8 may be used as an example for describing a procedure related to the embodiment(s) disclosed in the present disclosure. Also, any one of the steps of FIG. 8 may be omitted.

Referring to FIG. 8, the encoding apparatus may derive POC values of reference pictures constituting a reference picture set and derive POC values of a current picture (S800). For example, when the POC values of the reference pictures and the POC value of the current picture are derived, the encoding apparatus may perform inter prediction based on the reference picture set. For example, the reference picture set may be replaced with a reference picture list. For example, the encoding apparatus may derive POC values of the reference pictures constituting the reference picture list, and may derive the POC values of the current picture.

Also, as an example, the reference picture list may include a reference picture list 0 (L0) and a reference picture list 1 (L1). Here, the reference picture list 0 may include a reference picture having a smaller POC value than the POC of the current picture. The reference picture list 1 may include a reference picture having a POC value greater than that of the current picture.

The encoding apparatus may generate POC information (S810). For example, the encoding apparatus may generate the POC information based on POC values of the reference pictures and POC values of the current picture. The encoding apparatus may encode video/image information including POC information (S820).

For example, the video/image information may include high level syntax (HLS). Also, the high level syntax may include the POC information. The POC information may include POC-related information and syntax elements presented in embodiments of the present disclosure.

For example, the POC information may include POC information related to the current picture, POC information related to a previous picture in decoding order for deriving the POC of the current picture, or POC information related to reference picture(s).

For example, the POC information may include at least one of a syntax element ph_non_reference_picture_flag, a syntax element ph_non_reference_picture_flag, a syntax element ph_poc_msb_cycle_present_flag, a syntax element ph_poc_msb_cycle_val, and/or a syntax element ph_pic_order_cnt_lsb.

Figure 9:
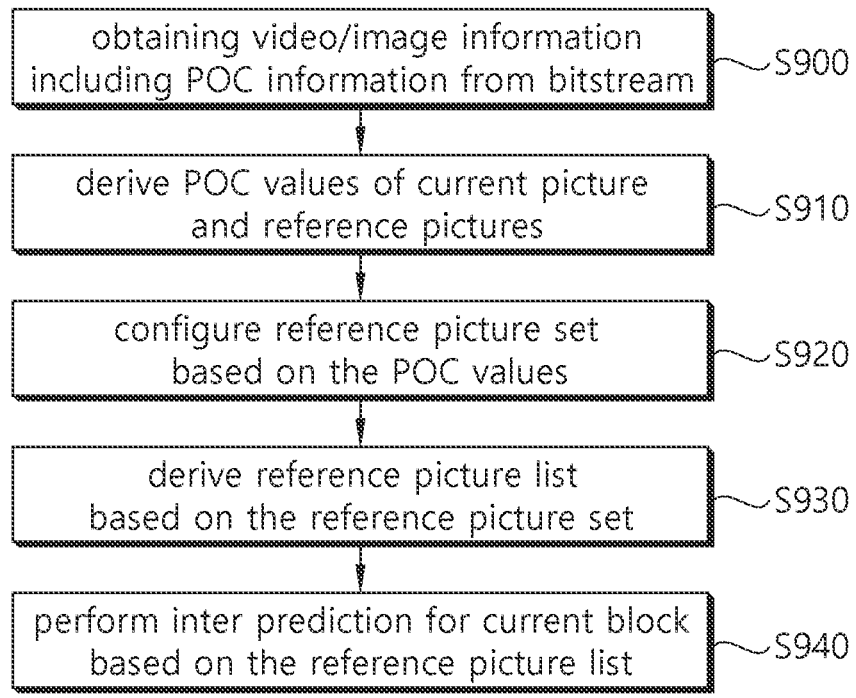
FIG. 9 shows an example of a POC-based video/image decoding method.

FIG. 9 shows an example of a POC-based video/image decoding method. The steps in FIG. 9 may be applied to the embodiment(s) disclosed in the present disclosure. Alternatively, the steps of FIG. 9 may be used as an example for describing a procedure related to the embodiment(s) disclosed in the present disclosure. Also, any one of the steps of FIG. 9 may be omitted.

Referring to FIG. 9, the decoding apparatus obtains video/image information including POC information from a bitstream (S900). For example, the video/image information may include high level syntax. Also, the high level syntax may include POC information. The POC information may include POC-related information and syntax elements presented in embodiments of the present disclosure.

For example, the POC information may include POC information related to the current picture, POC information related to a previous picture in decoding order for deriving the POC of the current picture, or POC information related to reference picture(s).

For example, the POC information may include at least one of a syntax element ph_non_reference_picture_flag, a syntax element ph_non_reference_picture_flag, a syntax element ph_poc_msb_cycle_present_flag, a syntax element ph_poc_msb_cycle_val, and/or a syntax element ph_pic_order_cnt_lsb.

The decoding apparatus derives POC values of the current picture and reference pictures (S910). For example, the decoding apparatus may derive the POC value of the current picture and the POC values of the reference pictures based on the POC information. For example, the POC value of the current picture may be derived based on POC information related to at least one of the current picture, a variable prevPicOrderCntLsb, and a variable prevPicOrderCntMsb. Also, as an example, a POC value of an ith reference picture among the POC values of the reference pictures may be derived based on a POC difference value indicated by POC information related to the reference pictures. For example, if i is 0, the POC information related to the reference pictures may be a POC difference value between the current picture and the ith reference picture. For example, if i is greater than 0, the POC information related to the reference pictures may be a POC difference value between the ith reference picture and an (i−1)th reference picture.

The decoding apparatus constructs a reference picture set based on the POC values (S920). For example, the decoding apparatus may construct a reference picture set based on the POC value of the current picture and the POC values of the reference pictures.

The decoding apparatus derives a reference picture list based on the reference picture set (S930). For example, the decoding apparatus may derive a reference picture list for the current picture based on the reference picture set.

The decoding apparatus performs inter prediction on the current picture based on the reference picture list (S940). For example, the decoding apparatus may perform inter prediction on the current picture based on the reference picture list.

Meanwhile, any one of the reference picture set or the reference picture list may be omitted. For example, if S930 is omitted, the decoding apparatus may perform inter prediction on the current picture based on the reference picture set in S940. Or, for example, instead of S920 and S930, the decoding apparatus may construct a reference picture list based on the POC values. As an example, the reference picture list may include a reference picture list 0 (L0) and a reference picture list 1 (L1). Here, the reference picture list 0 may include a reference picture having a smaller POC value than the POC of the current picture. Reference picture list 1 may include a reference picture having a larger POC value than the POC of the current picture.

However, according to an existing embodiment, the current POC decoding process includes a problem related to a non-reference picture. In the POC decoding process, the PicOrderCntMsb for the current picture is derived based on the POC value of the previous picture designated as prevTid0Pic. In this case, the previous picture designated as prevTid0Pic should be the same picture in encoding and decoding so that the POC value of the current picture is consistently derived. However, in determining prevTid0Pic, as prevTid0Pic is a non-reference picture (the value of the syntax element ph_non_ref_pic_flag is 1), whether it is a picture that may be removed by the system entity is not considered. If the picture designated as prevTid0Pic for the current picture is removed by the system and does not exist in the bitstream, the decoder may unconsciously use a picture different from the previous picture in the encoder as prevTid0Pic to derive the POC value of the current picture. As a result, there is a problem that the decoder may derive an incorrect POC value.

In this regard, embodiments of the present disclosure may include one or more of the following features.

1) In the POC decoding process, a picture designated as prevTid0Pic may be restricted so that it cannot be a picture in which the value of ph_non_ref_pic_flag is 1.

2) The value of ph_non_ref_pic_flag of a picture having a TemporalId of 0 may be limited so that it cannot be 1.

3) When the Coded Layer Video Sequence (CLVS) has a plurality of temporal sub-layers, pictures in the base temporal sub-layer (that is, pictures having TemporalId of 0) may be limited not to have a value of ph_non_ref_pic_flag equal to 1.

4) When the CLVS includes only pictures other than intra pictures (that is, the value of intra only constraint flag is equal to 1), a picture having a TemporalId of 0 may be limited not to have a value of ph_non_ref_pic_flag as 1.

5) When the CLVS includes only pictures that are not intra pictures (that is, the value of intra only constraint flag is equal to 1) and there are a plurality of temporal sub-layers in the CLVS, a picture having a TemporalId of 0 may be limited not to have a value of ph_non_ref_pic_flag as 1.

6) In the case of two consecutive pictures in which TemporalId is 0 and the value of ph_non_ref_pic_flag is 0, an absolute value of the POC difference between the two consecutive pictures may be limited not to be greater than half of MaxPicOrderCntLsb.

7) For each picture, the absolute value of the POC difference between the current picture and the picture selected by prevTid0Pic may be limited not to be greater than half of MaxPicOrderCntLsb.

According to an embodiment proposed in the present disclosure, image information obtained through a bitstream may include POC information and the non-reference picture flag according to the existing embodiment.

For example, the POC information may include POC information of a previous picture in a decoding order with respect to the current picture.

Here, as an example, the POC information of the previous picture in the decoding order of the current picture may be related to the POC LSB information of the previous picture. That is, the POC information of the previous picture may be related to the remainder obtained by dividing the POC value of the previous picture by MaxPicOrderCntLsb, which is the maximum value of the predetermined POC LSB. For example, the POC information of the previous picture may be expressed in the form of a ph_pic_order_cnt_lsb syntax element for the previous picture (prevTid0Pic).

According to the embodiment, the POC derivation process for the current picture may be as shown in Table 6 below.

TABLE 6

When ph_poc_msb_cycle_present_flag is equal to 0 and the current picture is not a CLVSS picture, the variables prevPicOrderCntLsb and prevPicOrderCntMsb are derived as follows:
- Let prevTid0Pic be the previous picture in decoding order that has nuh_layer_id equal to the nuh_layer_id of the current picture, has TemporalId equal to 0, has ph_non_ref_pic_flag equal to 0, and is not a RASL or RADL picture.
- The variable prevPicOrderCntLsb is set equal to ph pic order cnt lsb of prevTid0Pic.
- The variable prevPicOrderCntMsb is set equal to PicOrderCntMsb of prevTid0Pic.

According to the embodiment, the POC value of the current picture may be derived based on the POC value of the previous picture in decoding order.

For example, as in the existing embodiment, when the value of the POC MSB cycle presence flag is 0 and the current picture is not a CLVSS picture, the POC value of the current picture may be derived based the previous picture in the decoding order specified as prevTid0Pic.

Also, for example, in the previous picture in the decoding order designated as prevTid0Pic, as in the previous embodiment, the value of the layer ID information may be the same as the value of the layer ID information for the current picture, the temporal ID (TemporalId) may be 0, and the previous picture may be limited to a RASL picture or a non-RADL picture.

In addition, according to the embodiment, the previous picture in the decoding order for deriving the POC value of the current picture may be limited to a picture in which the value of the non-reference picture flag is 0. According to the embodiment, the picture in which the value of the non-reference picture flag is 1 cannot be designated as the previous picture in decoding order.

According to the embodiment proposed in the present disclosure, the POC information may further include a delta POC MSB cycle presence flag and delta POC MSB cycle long term (LT) information.

For example, the delta POC MSB cycle presence flag may be related to the presence of delta POC MSB cycle long term (LT) information for a long-term reference picture. That is, the delta POC MSB cycle presence flag may indicate/represent whether delta POC MSB cycle LT information for a long-term reference picture exists.

For example, the delta POC MSB cycle presence flag may be expressed in the form of a delta_poc_msb_cycle_present_flag syntax element. For example, the delta_poc_msb_cycle_present_flag syntax element may specify whether delta POC MSB cycle LT information for a long-term reference picture exists.

For example, the delta POC MSB cycle LT information may be related to the POC MSB of the long-term reference picture. That is, the delta POC MSB cycle LT information may be a value for calculating the POC MSB of the long-term reference picture.

For example, the delta POC MSB cycle LT information may be expressed in the form of a delta_poc_msb_cycle_lt syntax element. For example, the delta_poc_msb_cycle_lt syntax element may specify a value for calculating the POC MSB of the long-term reference picture.

According to the embodiment, when the value of the delta POC MSB cycle presence flag is 1, the POC information may further include the delta POC MSB cycle LT information. When the value of the delta POC MSB cycle presence flag is 0, the delta POC MSB cycle LT information may not exist.

Also, according to the embodiment, the POC value of the long-term reference picture may be derived based on at least one of the delta POC MSB cycle presence flag and the delta POC MSB cycle LT information.

Also, according to the embodiment, in a case in which the POC value of the long-term reference picture may be derived based on at least one of the delta POC MSB cycle presence flag and the delta POC MSB cycle LT information and there are more than one specific POC value in which the remainder obtained by dividing MaxPicOrderCntLsb which is the maximum value of the POC LSB predetermined in the previous picture POC set is the same as the POC LSB of the long-term reference picture, the value of the delta POC MSB cycle presence flag may be limited to 1.

Alternatively, according to the embodiment, in a case in which the POC value of the long-term reference picture may be derived based on at least one of the delta POC MSB cycle presence flag and the delta POC MSB cycle LT information and there are more than one specific POC value in which the remainder obtained by dividing MaxPicOrderCntLsb which is the maximum value of the POC LSB predetermined in the previous picture POC set is the same as the POC LSB of the long-term reference picture, the value of the delta POC MSB cycle presence flag may be limited to 1.

At this time, according to the embodiment, the previous picture POC set may include the POC value of the previous picture in the decoding order for the current picture, the POC value of each reference picture having the same layer ID as the current picture in the reference picture list for the previous picture, and a POC value of each picture that follows the previous picture and precedes the current picture in decoding order and has the same layer ID as the current picture.

According to the embodiment, the semantics of the delta POC MSB cycle presence flag may be expressed, for example, as shown in Table 7 below.

TABLE 7 delta_poc_msb_cycle_present_flag[ i ][ j ] equal to 1 specifies
that delta_poc_msb_cycle_lt[ i ][ j ] is present.
delta_poc_msb_cycle_present_flag[ i ][ j ] equal to 0 specifies
that delta_poc_msb_cycle_lt[ i ][ j ] is not present.
Let prevTid0Pic be the previous picture in decoding order that has
nuh_layer_id the same as the slice or picture header referring to the
ref_pic_lists( ) syntax structure, has TemporalId equal to 0, has
ph_non_ref_pic_flag equal to 0, and is not a RASL or RADL picture.
Let setOfPrevPocVals be a set consisting of the following:
- the PicOrderCntVal of prevTid0Pic,
- the PicOrderCntVal of each picture that is referred to by
  entries in RefPicList[ 0 ] or RefPicList[ 1 ] of prevTid0Pic
  and has nuh_layer_id the same as the current picture,
- the PicOrderCntVal of each picture that follows prevTid0Pic
  in decoding order, has nuh_layer_id the same as the current
  picture, and precedes the current picture in decoding order.
When there is more than one value in setOfPrevPocVals for which the
value modulo MaxPicOrderCntLsb is equal to PocLsbLt[ i ][ j ], the value
of delta_poc_msb_cycle_present_flag[ i ][ j ] shall be equal to 1.

In addition, according to an embodiment proposed in the present disclosure, the variable maxPicOrderCnt and the variable minPicOrderCnt may be set to maximum and minimum values of the POC values of specific pictures, respectively. For example, the specific pictures may be shown in Table 8 below.

TABLE 8

For each current picture, let the variables maxPicOrderCnt and
minPicOrderCnt be set equal to the maximum and the minimum,
respectively, of the PicOrderCntVal values of the following
pictures with nuh_layer_id equal to currPicLayerId:
- The current picture.
- The previous picture in decoding order that has TemporalId equal to
  0, has ph_non_ref_pic_flag equal to 0, and is not a RASL or RADL
  picture.
- The STRPs referred to by all entries in RefPicList[ 0 ] and all
  entries in RefPicList[ 1 ] of the current picture.
- All pictures n that have PictureOutputFlag equal to 1,
  AuCpbRemovalTime[ n ] less than AuCpbRemovalTime[ currPic ] and
  DpbOutputTime[ n ] greater than or equal to AuCpbRemovalTime[
  currPic ], where currPic is the current picture.

That is, according to the embodiment, a maximum value of the POC value for the specific pictures may be set to the same value for each of the specific pictures, and the minimum value of the POC value for the specific pictures may be set to the same value for each of the specific pictures.

In this case, for example, the specific pictures having the same layer ID as the layer ID of the current picture may have a TemporalId of 0, may have a value of the non-reference picture flag of 0, and may include a previous picture in decoding order other than a RASL or RADL picture.

That is, according to the embodiments described above, the previous picture in the decoding order designated as prevTid0Pic for deriving the POC value of the current picture may be limited to a picture in which the value of the non-reference picture flag is 0. Through this, the encoder and the decoder may support the same picture designated as prevTid0Pic, and as a result, it is possible to prevent the POC value for the current picture from being erroneously derived in the decoding process.

In addition, according to the embodiment proposed in the present disclosure, a POC difference value between the current picture and the previous picture in the decoding order for deriving the POC value of the current picture may be smaller than a half value of MaxPicOrderCntLsb which is the maximum value of the predetermined POC LSB.

Alternatively, according to an embodiment proposed in the present disclosure, the POC difference value between the current picture and the previous picture in the decoding order for deriving the POC value of the current picture may not be larger than the half value of MaxPicOrderCntLsb which is the maximum value of the predetermined POC LSB.

That is, according to the above-described embodiments, the POC difference value between the previous picture and the current picture in the decoding order specified as prevTid0Pic for deriving the POC value of the current picture may be limited to be less than half of MaxPicOrderCntLsb. Through this, an error due to network congestion may be prevented and an accurate POC value may be derived.

According to an embodiment proposed in the present disclosure, the semantics of the non-reference picture flag included in the syntax of Table 1 may be represented, for example, as shown in Table 9 below.

TABLE 9 ph_non_ref_pic_flag equal to 1 specifies the picture associated with the PH is never used as a reference picture.
ph_non_ref_pic_flag equal to 0 specifies the picture associated with the PH may or may not be used as a reference picture.
It is a constraint of the bitstream conformance that the value of ph_non_ref_pic_flag shall not be equal to 1 when TemporalId of the picture associated with the picture header is equal to 0.

That is, when the temporal ID (TemporalId) of the current picture is 0, the value of the non-reference picture flag for the current picture may be limited not to be 1.

According to the embodiment proposed in the present disclosure, the semantics of the non-reference picture flag included in the syntax of Table 1 may be represented, for example, as shown in Table 10 below.

TABLE 10 ph_non_ref_pic_flag equal to 1 specifies the picture associated with the PH is never used as a reference picture.
ph_non_ref_pic_flag equal to 0 specifies the picture associated with the PH may or may not be used as a reference picture.
It is a constraint of the bitstream conformance that when the current CLVS contains more than one temporal sub-layer, the value of ph_non_ref_pic_flag shall not be equal to 1 when TemporalId of the picture associated with the picture header is equal to 0.

That is, when the current coded layer video sequence (CLVS) includes a plurality of temporal sub-layers and the temporal ID (TemporalId) of the current picture is 0, the value of the non-reference picture flag for the current picture may be limited not to be 1.

According to the embodiment proposed in the present disclosure, the semantics of the non-reference picture flag included in the syntax of Table 1 may be represented, for example, as shown in Table 11 below.

TABLE 11 ph_non_ref_pic_flag equal to 1 specifies the picture associated with the PH is never used as a reference picture.

TABLE 11-continued ph_non_ref_pic_flag equal to 0 specifies the picture associated with the PH may or may not be used as a reference picture.
It is a constraint of the bitstream conformance that when the value of sps_max_sublayers_minus1 is greater than 0, the value of ph_non_ref_pic_flag shall not be equal to 1 when TemporalId of the picture associated with the picture header is equal to 0.

That is, according to the embodiment, the image information may further include maximum sub-layer information.

For example, the maximum sub-layer information may be related to a maximum number of temporal sub-layers present in the CLVS. The maximum sub-layer information may indicate/represent the maximum number of temporal sub-layers present in the CLVS.

For example, the maximum sub-layer information may be expressed in the form of a sps_max_sublayers_minus1 syntax element. For example, the value +1 of the sps_max_sublayers_minus1 syntax element may specify a maximum number of temporal sublayers present in the CLVS.

According to the embodiment, when the value of the maximum sub-layer information is greater than 0 and the temporal ID (TemporalId) of the current picture is 0, the value of the non-reference picture flag for the current picture may be limited not to be 1.

According to an embodiment proposed in the present disclosure, the semantics of the non-reference picture flag included in the syntax of Table 1 may be represented, for example, as shown in Table 12 below.

TABLE 12 ph_non_ref_pic_flag equal to 1 specifies the picture associated with the PH is never used as a reference picture.
ph_non_ref_pic_flag equal to 0 specifies the picture associated with the PH may or may not be used as a reference picture.
It is a constraint of the bitstream conformance that when the value of intra_only_constraint_flag is equal to 0, the value of ph_non_ref_pic_flag shall not be equal to 1 when TemporalId of the picture associated with the picture header is equal to 0.

That is, according to the embodiment, the image information may further include an intra restriction flag.

For example, the intra restriction flag may be related to whether pictures in CLVS are restricted to intra pictures. That is, the intra restriction flag may indicate/represent whether pictures in CLVS are restricted to intra pictures.

As an example, the intra restriction flag may be expressed in the form of an intra_only_constraint_flag syntax element. For example, the intra_only_constraint_flag syntax element may specify whether pictures in CLVS are restricted to intra pictures.

According to the embodiment, when the value of the intra restriction flag is 0 and the temporal ID (TemporalId) of the current picture is 0, the value of the non-reference picture flag for the current picture may be restricted not to be 1.

According to the embodiment proposed in the present disclosure, the semantics of the non-reference picture flag included in the syntax of Table 1 may be represented, for example, as shown in Table 13 below.

TABLE 13 ph_non_ref_pic_flag equal to 1 specifies the picture associated with the PH is never used as a reference picture.
ph_non_ref_pic_flag equal to 0 specifies the picture associated with the PH may or may not be used as a reference picture.

TABLE 13-continued

It is a constraint of the bitstream conformance that when the current CLVS contains more than one temporal sub-layer and the value of intra_only_constraint_flag is equal to 0, the value of ph_non_ref_pic_flag shall not be equal to 1 when TemporalId of the picture associated with the picture header is equal to 0.

That is, according to the embodiment, when the current CLVS includes a plurality of temporal sublayers, the value of the intra restriction flag is 0, and the temporal ID (TemporalId) of the current picture is 0, the value of the non-reference picture flag may then be limited not to be 1.

According to an embodiment proposed in the present disclosure, the image information may further include temporal ID information.

For example, the temporal ID information may be related to a temporal identifier for the NAL unit. That is, the temporal ID information may indicate/represent a temporal identifier for the NAL unit.

For example, the temporal ID information may be expressed in the form of a nuh_temporal_id_plus1 syntax element. For example, the value −1 of the nuh_temporal_id_plus1 syntax element may specify a temporal identifier for the NAL unit.

According to the embodiment, the semantics of the temporal ID information may be represented, for example, as shown in Table 14 below.

TABLE 14 nuh_temporal_id_plus1 minus 1 specifies a temporal identifier for the NAL unit.
The value of nuh_temporal_id_plus1 shall not be equal to 0.
The variable TemporalId is derived as follows:
    TemporalId = nuh_temporal_id_plus1 − 1    (36)
When nal_unit_type is in the range of IDR_W_RADL to RSV_IRAP_12, inclusive, TemporalId shall be equal to 0.
When nal_unit_type is equal to STSA_NUT and vps_independent_layer_flag[ GeneralLayerIdx[ nuh_layer_id ] ] is equal to 1, TemporalId shall not be equal to 0.
The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
- If nal_unit_type is equal to DCI_NUT, VPS_NUT, or SPS_NUT, TemporalId shall be equal to 0 and the TemporalId of the AU containing the NAL unit shall be equal to 0.
- Otherwise, if nal_unit_type is equal to PH_NUT, TemporalId shall be equal to the TemporalId of the PU containing the NAL unit.
- Otherwise, if nal_unit_type is equal to EOS_NUT or EOB_NUT, TemporalId shall be equal to 0.
- Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.
- Otherwise, when nal_unit_type is equal to PPS_NUT, PREFIX_APS_NUT, or SUFFIX_APS_NUT, TemporalId shall be greater than or equal to the TemporalId of the PU containing the NAL unit.
NOTE 7 - When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX APS NUT, or SUFFIX APS NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

TABLE 14-continued

Let picture picA and picB be two pictures with TemporalId equal to 0, it is a constraint of conformance bitstream that DiffPicOrderCnt( picB, picA ) shall not be greater than MaxPicOrderCntLsb / 2 when all of the following conditions are satisfied:
- The values of nuh_layer_id of picA and picB are the same.
- picA and picB are not RADL picture or RASL picture.
- The value of ph_non_reference_picture_flag of picA and picB are both equal to 0.
- picB is the first picture with TemporalId equal to 0 that follows picA in output order.

That is, according to the embodiment, the temporal ID (TemporalId) may be derived based on the temporal ID information.

According to the embodiment, when the values of the layer ID information are the same for the first picture and the second picture having a temporal ID (TemporalId) of 0, are not a RASL picture or a RADL picture, a value of the non-reference picture flag is 0, and the second picture is a first picture whose temporal ID that follows the first picture in output order is 0, a POC difference value between the first picture and the second picture may not be greater than half of MaxPicOrderCntLsb which is a maximum value of the predetermined POC LSB.

Alternatively, according to an embodiment proposed in the present disclosure, the semantics of the temporal ID information may be represented, for example, as shown in Table 15 below.

TABLE 15

PGP-36 nuh_temporal_id_plus1 minus 1 specifies a temporal identifier for the NAL unit.
The value of nuh_temporal_id_plus1 shall not be equal to 0.
The variable TemporalId is derived as follows:
    TemporalId = nuh_temporal_id_plus1 − 1    (36)
When nal_unit_type is in the range of IDR_W_RADL to RSV_IRAP_12, inclusive, TemporalId shall be equal to 0.
When nal_unit_type is equal to STSA_NUT and vps_independent_layer_flag[ GeneralLayerIdx[ nuh_layer_id ] ] is equal to 1, TemporalId shall not be equal to 0.
The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.
The value of TemporalId for non-VCL NAL units is constrained as follows:
- If nal_unit_type is equal to DCI_NUT, VPS_NUT, or SPS_NUT, TemporalId shall be equal to 0 and the TemporalId of the AU containing the NAL unit shall be equal to 0.
- Otherwise, if nal_unit_type is equal to PH_NUT, TemporalId shall be equal to the TemporalId of the PU containing the NAL unit.
- Otherwise, if nal_unit_type is equal to EOS_NUT or EOB_NUT, TemporalId shall be equal to 0.
- Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.
- Otherwise, when nal_unit_type is equal to PPS_NUT, PREFIX_APS_NUT, or SUFFIX_APS_NUT, TemporalId shall be greater than or equal to the TemporalId of the PU containing the NAL unit.
Note 7 - When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX APS NUT, or SUFFIX APS NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

TABLE 15-continued

PGP-36

Let picture picA and picB be two pictures with TemporalId equal
to 0, it is a constraint of conformance bitstream that
DiffPicOrderCnt( picB, picA ) shall not be greater than
MaxPicOrderCntLsb / 2 when all of the following conditions are
satisfied:
- The values of nuh_layer_id of picA and picB are the same.
- picA and picB are not RADL picture or RASL picture.
- The value of ph_non_reference_picture_flag of picA and picB
  are both equal to 0.
- picB follows picA in outuput order.
- There shall be no picture with TemporalId equal to 0, have
  the same nuh_layer_id as nuh_layer_id of picA, not a RADL or
  RASL picture, that follows picA in output order but precedes
  picB in output order.

Similarly, according to the embodiment, the temporal ID (TemporalId) may be derived based on the temporal ID information.

In addition, according to the embodiment, for the first picture and the second picture having a temporal ID (TemporalId) of 0, conditions in which the layer ID information may be the same as each other, the first picture and the second picture are not RASL picture or a RADL picture, and a value of the non-reference picture flag is 0 may be satisfied.

In this case, according to the embodiment, when a picture satisfying the conditions in which the second picture follows the first picture in output order, and follows the first picture and precedes the second picture in output order does not exist, the POC difference value between the first picture and the second picture may not be greater than a half value of MaxPicOrderCntLsb, which is the maximum value of the predetermined POC LSB.

That is, according to the embodiments described above, the POC difference value between the continuous first picture and the second picture satisfying the above condition may be limited to be less than half of MaxPicOrderCntLsb. Through this, an error due to network congestion may be prevented and an accurate POC value may be derived.

The following drawings are created to explain a specific example of the present disclosure. Since the names of specific devices described in the drawings or the names of specific signals/messages/fields are presented by way of example, the technical features of the present disclosure are not limited to the specific names used in the following drawings.

Figure 10:
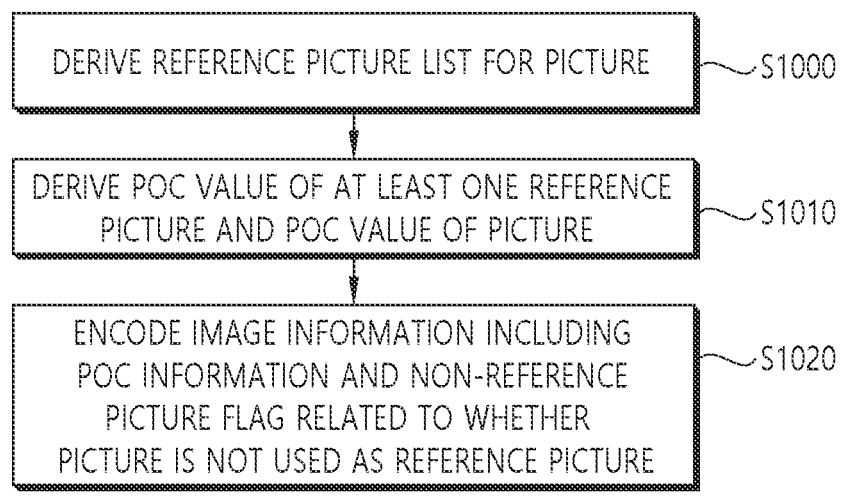
FIGS. 10 and 11 schematically show an example of a video/image encoding method and related components according to embodiment(s) of the present disclosure.
Figure 11:
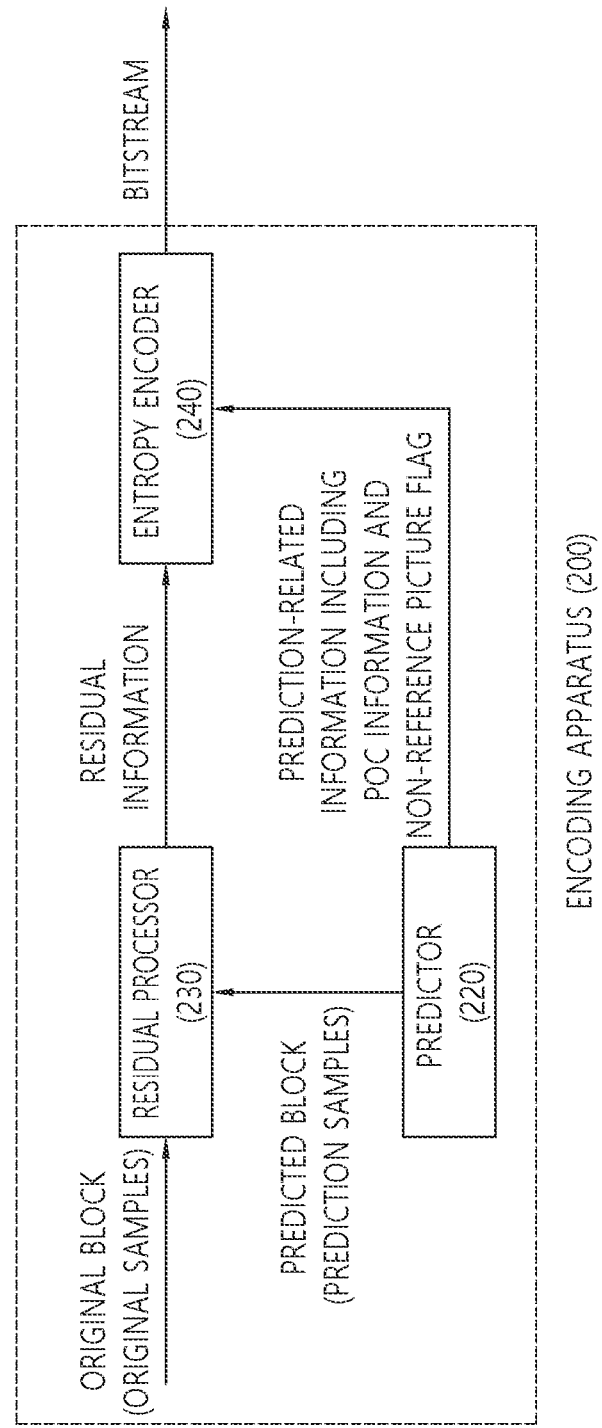

FIGS. 10 and 11 schematically show an example of a video/image encoding method and related components according to embodiment(s) of the present disclosure. The method disclosed in FIG. 10 may be performed by the encoding apparatus disclosed in FIG. 2. Specifically, for example, S1000 and S1010 of FIG. 10 may be performed by the predictor 220 of the encoding apparatus 200, and S1020 of FIG. 10 may be performed by the entropy encoder 240 of the encoding apparatus 200. The method disclosed in FIG. 10 may include the embodiments described above in the present disclosure.

Referring to FIG. 10, the encoding apparatus derives a reference picture list for a picture (S1000). For example, the encoding apparatus may derive a reference picture list for the current picture. For example, when the reference picture list is derived, the encoding apparatus may derive prediction samples for the current block in the current picture by performing inter prediction based on the reference picture list. Also, for example, the encoding apparatus may derive residual samples based on the prediction samples. For example, the encoding apparatus may derive the residual samples by comparing the original samples of the current block with the prediction samples. Also, the encoding apparatus may generate residual information based on the residual samples, and may additionally generate residual samples from the already reconstructed samples.

The encoding apparatus derives a POC value of at least one reference picture and a POC value of the picture (S1010). For example, the encoding apparatus may derive the POC value of the at least one reference picture and the POC value of the current picture based on the reference picture list. As an example, the encoding apparatus may derive the POC value of the at least one reference picture constituting the reference picture list, and may derive the POC value of the current picture. For example, the POC value of the current picture may be derived based on the POC value of a previous picture in decoding order. For example, the at least one reference picture may include a long-term reference picture. Also, as an example, the reference picture list may include a reference picture list 0 (L0) and a reference picture list 1 (L1). Here, the reference picture list 0 may include a reference picture having a smaller POC value than the POC of the current picture. Also, the reference picture list 1 may include a reference picture having a larger POC value than the POC of the current picture.

For example, the encoding apparatus may generate POC information based on the POC value of the at least one reference picture and the POC value of the current picture. For example, the POC information may include POC information related to the current picture, POC information related to a previous picture in decoding order for deriving the POC of the current picture, or POC information related to reference picture(s).

The encoding apparatus encodes the video/image information (S1020). For example, the encoding apparatus may encode video/image information including the POC information and/or a non-reference picture flag related to whether a picture is not used as a reference picture. Also, for example, the encoding apparatus may encode the video/image information further including layer ID information and/or temporal ID information.

For example, the video/image information may include a high level syntax (HLS), and the HLS may include the POC information and the non-reference picture flag. Also, the HLS may include the layer ID information and/or the temporal ID information.

For example, the video/image information may include at least one of the POC information, the non-reference picture flag, the layer ID information, and/or the temporal ID information. For example, the video/image information may further include a picture header and/or a NAL unit header. For example, the POC information and the non-reference picture flag may be included in the picture header, and the layer ID information and the temporal ID information may be included in the NAL unit header. For example, the video/image information may include at least one of ph_non_ref_pic_flag, nuh_layer_id, and/or nuh_temporal_id_plus1 syntax elements.

Also, for example, the POC information may include at least one of POC LSB information, POC MSB cycle presence flag, delta POC MSB cycle presence flag, and/or delta POC MSB cycle LT information. For example, the POC information may be included in the picture header. For example, the POC information may include at least one of ph_pic_order_cnt_lsb ph_poc_msb_cycle_present_flag, delta_poc_msb_cycle_present_flag, and/or delta_poc_msb_cycle_lt.

Further, the video/image information may include various information according to the exemplary embodiments of the present disclosure. For example, the video/image information may include the information disclosed in at least one of Tables 2, 4, 6, 7, 8, 14, and/or 15 described above.

Meanwhile, the video/image information may include prediction information and residual information. The prediction information as information related to the prediction procedure may include information about prediction mode information (e.g., a skip flag, a merge flag, or a mode index) and motion information. The information about the motion information may include candidate selection information (e.g., a merge index, an mvp flag or an mvp index), which is information for deriving a motion vector. Further, the information about the motion information may include the aforementioned information about the MVD and/or reference picture index information. Further, the information about the motion information may include information representing whether L0 prediction, L1 prediction, or Bi prediction is applied. The residual information is information about the residual samples. The residual information may include information about quantized transform coefficients for the residual samples.

The encoded video/image information may be output in the form of a bitstream. The bitstream may be transmitted to the decoding apparatus through a network or a storage medium.

Further, as described above, the encoding apparatus may generate a reconstructed picture (including reconstructed samples and reconstructed block) based on the reference samples and the residual samples. This is to derive the same prediction result as that obtained by being performed by the decoding apparatus in the encoding apparatus, and as a result, it is possible to enhance coding efficiency. Therefore, the encoding apparatus may store the reconstructed picture (or the reconstructed samples and the reconstructed block) in a memory and use the reconstructed picture as a reference picture for the inter prediction. As described above, the in-loop filtering procedure or the like may be further applied to the reconstructed picture.

Specifically, the POC information may include various information according to an embodiment of the present disclosure.

According to an embodiment proposed in the present disclosure, the POC information may include POC information of a previous picture in decoding order with respect to the current picture. In this case, for example, the previous picture in the decoding order for deriving the POC value of the current picture may be limited to a picture in which the value of the non-reference picture flag is 0. Also, for example, the POC information of the previous picture in the decoding order for the current picture may be related to the remainder obtained by dividing the POC value of the previous picture by MaxPicOrderCntLsb which is the maximum value of the predetermined POC LSB.

Also, according to an embodiment, the POC information may further include a POC MSB cycle presence flag related to the presence of POC MSB cycle information of the current picture. At this time, for example, based on the case where the value of the POC MSB cycle presence flag is 0 and the current picture is not a CLVSS picture, the POC value of the current picture may be derived based on the POC value of the previous picture in the decoding order.

In this case, according to an embodiment, the image information may further include layer ID information related to a layer identifier to which the NAL unit belongs. In this case, for example, the previous picture in the decoding order for deriving the POC value of the current picture may be limited to that the value of the layer ID information is the same as the value of the layer ID information of the current picture, and the temporal ID (TemporalId) and the value of the non-reference picture flag is 0, and the previous picture is not a RASL picture or a non-RADL picture.

Also, according to an embodiment, the POC difference value between the current picture and the previous picture in the decoding order for deriving the POC value of the current picture may be less than a half value of MaxPicOrderCntLsb which is the maximum value of the predetermined POC LSB.

Also, according to an embodiment, the POC information may further include a delta POC MSB cycle presence flag related to the presence of delta POC MSB cycle long term (LT) information for a long-term reference picture. In this case, for example, based on a case in which the value of the delta POC MSB cycle presence flag is 1, the POC information may further include the delta POC MSB cycle LT information. For example, the delta POC MSB cycle LT information may be related to the POC MSB of the long-term reference picture. Also, for example, based on a case in which the POC value of the long-term reference picture may be derived based on at least one of the delta POC MSB cycle presence flag and the delta POC MSB cycle LT information and there are more than one specific POC value in which the remainder obtained by dividing MaxPicOrderCntLsb which is the maximum value of the POC LSB predetermined in the previous picture POC set is the same as the POC LSB of the long-term reference picture, the value of the delta POC MSB cycle presence flag may be limited to 1. Alternatively, for example, based on a case in which the POC value of the long-term reference picture may be derived based on at least one of the delta POC MSB cycle presence flag and the delta POC MSB cycle LT information and there are more than one specific POC value in which the remainder obtained by dividing MaxPicOrderCntLsb which is the maximum value of the POC LSB predetermined in the previous picture POC set is the same as the POC LSB of the long-term reference picture, the value of the delta POC MSB cycle presence flag may be limited to 1.

At this time, according to the embodiment, the previous picture POC set may include the POC value of the previous picture in the decoding order for the current picture, the POC value of each reference picture having the same layer ID as the current picture in the reference picture list for the previous picture, and a POC value of each picture that follows the previous picture and precedes the current picture in decoding order and has the same layer ID as the current picture.

Also, according to an embodiment, the image information may further include layer ID information related to a layer identifier to which the NAL unit belongs. In this case, for example, based on a case in which, with respect to the first picture and the second picture in which the temporal ID (TemporalId) is 0, the layer ID information values are the same, they are not RASL pictures or RADL pictures, the non-reference picture flag value is 0, and the second picture is a first picture whose temporal ID that follows the first picture in output order is 0, the POC difference value between the first picture and the second picture may not be greater than a half value of MaxPicOrderCntLsb which is the maximum value of the predetermined POC LSB.

Also, according to an embodiment, the image information may further include layer ID information related to a layer identifier to which the NAL unit belongs. In this case, for example, based on a case in which, with respect to the first picture and the second picture in which the temporal ID (TemporalId) is 0, there is no picture satisfying a condition in which the layer ID information values are the same, they are not RASL pictures or RADL pictures, the value of the non-reference picture flag is 0 is satisfied and satisfying a condition in which the second picture follows the first picture in output order and follows the first picture and precedes the second picture in output order, the POC difference value between the first picture and the second picture may not be greater than a half value of MaxPicOrderCntLsb which is the maximum value of the predetermined POC LSB.

Also, according to an embodiment, based on a case in which a temporal ID (TemporalId) of a specific picture is 0, the value of the non-reference picture flag for the specific picture may be limited not to be 1.

Figure 12:
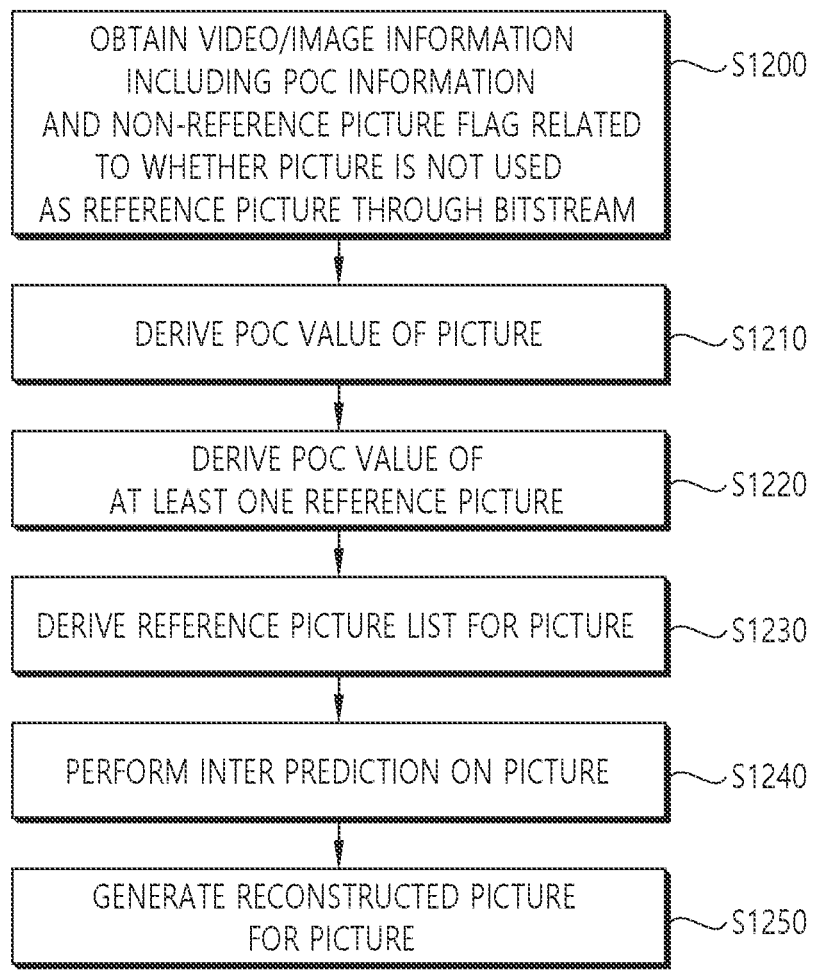
FIGS. 12 and 13 schematically show an example of a video/image decoding method and related components according to an embodiment of the present disclosure.
Figure 13:
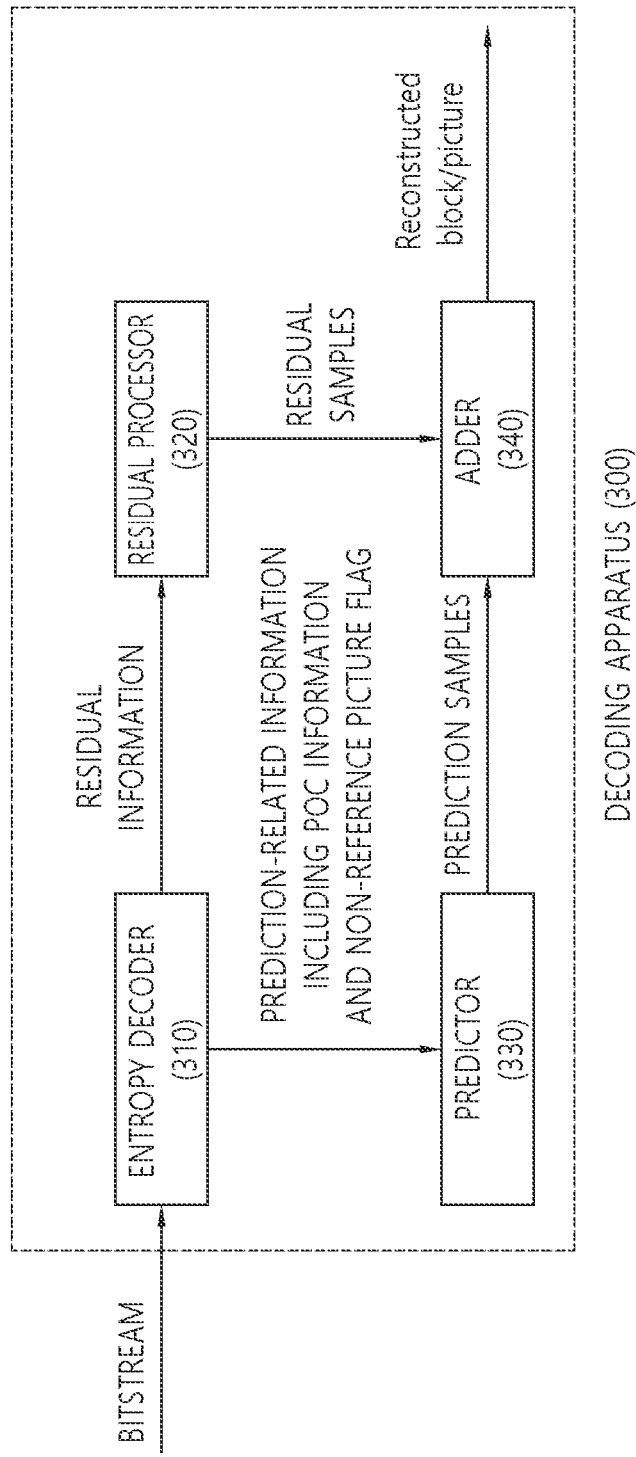

FIGS. 12 and 13 schematically show an example of a video/image decoding method and related components according to an embodiment of the present disclosure. The method disclosed in FIG. 12 may be performed by the decoding apparatus illustrated in FIG. 3. Specifically, for example, S1200 of FIG. 12 may be performed by the entropy decoder 310 of the decoding apparatus 300, and S1210 to S1240 may be performed by the predictor 330 of the decoding apparatus 300. Also, S1250 may be performed by the adder 340 of the decoding apparatus 300. The method disclosed in FIG. 12 may include the embodiments described above in the present disclosure.

Referring to FIG. 12, the decoding apparatus receives/obtains video/image information (S1200). For example, the decoding apparatus may receive/obtain the video/image information through a bitstream. As an example, the decoding apparatus may receive/obtain the video/image information through a bitstream. For example, the video/image information may include POC information and a non-reference picture flag related to whether a picture is not used as a reference picture. Also, for example, the video/image information may further include layer ID information and/or temporal ID information.

For example, the video/image information may include a high level syntax (HLS), and the HLS may include the POC information and the non-reference picture flag. Also, the HLS may include the layer ID information and/or the temporal ID information.

For example, the video/image information may include at least one of the POC information, the non-reference picture flag, the layer ID information, and/or the temporal ID information. For example, the video/image information may further include a picture header and/or a NAL unit header. For example, the POC information and the non-reference picture flag may be included in the picture header, and the layer ID information and the temporal ID information may be included in the NAL unit header. For example, the video/image information may include at least one of ph_n-on_ref_pic_flag, nuh_layer_id, and/or nuh_temporal_id_plus1 syntax elements.

Also, for example, the POC information may include at least one of POC LSB information, POC MSB cycle presence flag, delta POC MSB cycle presence flag, and/or delta POC MSB cycle LT information. For example, the POC information may be included in the picture header. For example, the POC information may include at least one of ph_pic_order_cnt_lsb ph_poc_msb_cycle_present_flag, delta_poc_msb_cycle_present_flag, and/or delta_poc_msb_cycle_lt. Also, for example, the POC information may include POC information related to the current picture, POC information related to a previous picture in decoding order for deriving the POC of the current picture, or POC information related to reference picture(s).

Further, the video/image information may include various information according to the exemplary embodiments of the present disclosure. For example, the video/image information may include information disclosed in at least one of Tables 2, 4, 6, 7, 8, 14, and/or 15 described above.

Meanwhile, for example, the video/image information may include prediction information and residual information. The prediction information as information related to the prediction procedure may include information about prediction mode information (e.g., a skip flag, a merge flag, or a mode index) and motion information. The information about the motion information may include candidate selection information (e.g., a merge index, an mvp flag, or an mvp index), which is information for deriving a motion vector. Further, the information about the motion information may include the aforementioned information about the MVD and/or reference picture index information. Further, the information about the motion information may include information representing whether L0 prediction, L1 prediction, or Bi prediction is applied. The residual information is information about the residual samples. The residual information may include information about quantized transform coefficients for the residual samples.

Meanwhile, for example, the video/image information may further include information related to a reference picture list. The information related to the reference picture list may include the ref_pic_lists field, and the information related to the reference picture list may be constituted/included in a picture header or a slice header and delivered. The information related to the reference picture list may include information used for deriving the reference picture list. For example, the information related to the reference picture list may include at least one of the information related to the reference picture list index, the information related to the long-term reference picture, and/or the information related to the short-term reference picture. The information related to the long-term reference picture may include information about a picture order count (POC) of the long-term reference picture. The information related to the short-term reference picture may include the information about the ith delta POC of the short-term reference picture, and the delta POC may be derived based on the (i−1)th POC.

The decoding apparatus derives a POC value of the picture (S1210). For example, the decoding apparatus may derive the POC value of the current picture based on the POC information. For example, the POC value of the current picture may be derived based on the POC value of a previous picture in decoding order. For example, the POC value of the current picture may be derived based on POC information related to at least one of the current picture, a variable prevPicOrderCntLsb, and a variable prevPicOrderCntMsb.

The decoding apparatus derives a POC value of at least one reference picture (S1220). For example, the decoding apparatus may derive the POC value of the at least one reference picture based on the POC value of the current picture. For example, a POC value of an ith reference picture, among the POC values of the reference pictures, may be derived based on a POC difference value indicated by POC information related to the reference pictures. For example, if i is 0, the POC information related to the reference pictures may be a POC difference value between the current picture and the ith reference picture. For example, if i is greater than 0, the POC information related to the reference pictures may be a POC difference value between the ith reference picture and an (i−1)th reference picture. Also, as an example, the at least one reference picture may include a long-term reference picture.

The decoding apparatus derives a reference picture list for the picture (S1230). For example, the decoding apparatus may derive the reference picture list for the current picture based on the POC value of the at least one reference picture. As an example, the reference picture list may include a reference picture list 0 (L0) and a reference picture list 1 (L1). Here, the reference picture list 0 may include a reference picture having a smaller POC value than the POC of the current picture. Reference picture list 1 may include a reference picture having a larger POC value than the POC of the current picture.

The decoding apparatus performs inter prediction on a picture (S1240). For example, the decoding apparatus may perform inter prediction on the current picture based on the reference picture list. For example, the decoding apparatus may generate prediction samples for the current block in the current picture based on the reference picture in the reference picture list. Also, for example, the decoding apparatus may derive residual samples based on the prediction samples. For example, the decoding apparatus may derive the residual samples by comparing original samples of the current block with the prediction samples. For example, the decoding apparatus may derive the reference picture index of the current picture. For example, a picture indicated by the reference picture index in the reference picture list related to the current picture may be derived as a reference picture referenced for inter prediction of the current block in the current picture. The reference picture may be derived based on the reference picture index of the current block, and the prediction samples of the current block may be derived using samples of the reference block indicated by the motion vector of the current block on the reference picture. In this case, as described above, a prediction sample filtering procedure for all or some of the prediction samples of the current block may be further performed in some cases.

The decoding apparatus generates a reconstructed picture for the picture (S1250). For example, the decoding apparatus may generate a reconstructed picture for the current picture based on a result of the inter prediction. For example, the decoding apparatus may generate the reconstructed samples for the current picture based on the prediction samples. Also, for example, the decoding apparatus may generate the reconstructed samples for the current picture based on residual samples and the prediction samples for the current picture. The residual samples for the current block may be generated based on received residual information. Also, the decoding apparatus may generate, for example, a reconstructed picture including the reconstructed samples. Thereafter, as described above, an in-loop filtering procedure may be further applied to the reconstructed picture.

Specifically, the POC information may include various information according to an embodiment of the present disclosure.

According to an embodiment proposed in the present disclosure, the POC information may include POC information of a previous picture in a decoding order with respect to the current picture. In this case, for example, the previous picture in the decoding order for deriving the POC value of the current picture may be limited to a picture in which the value of the non-reference picture flag is 0. Also, for example, the POC information of the previous picture in the decoding order for the current picture may be related to the remainder obtained by dividing the POC value of the previous picture by MaxPicOrderCntLsb which is the maximum value of the predetermined POC LSB.

Also, according to an embodiment, the POC information may further include a POC MSB cycle presence flag related to the presence of POC MSB cycle information of the current picture. At this time, for example, based on the case where the value of the POC MSB cycle presence flag is 0 and the current picture is not a CLVSS picture, the POC value of the current picture may be derived based on the POC value of the previous picture in the decoding order.

In this case, according to an embodiment, the image information may further include layer ID information related to a layer identifier to which the NAL unit belongs. In this case, for example, the previous picture in the decoding order for deriving the POC value of the current picture may be limited to that the value of the layer ID information is the same as the value of the layer ID information of the current picture, the temporal ID (TemporalId) and the value of the non-reference picture flag is 0, and the previous picture is not a RASL picture or a RADL picture.

Also, according to an embodiment, the POC difference value between the current picture and the previous picture in the decoding order for deriving the POC value of the current picture may be less than a half value of MaxPicOrderCntLsb which is the maximum value of the predetermined POC LSB.

Also, according to an embodiment, the POC information may further include a delta POC MSB cycle presence flag related to the presence of delta POC MSB cycle long term (LT) information for a long-term reference picture. In this case, for example, based on a case in which the value of the delta POC MSB cycle presence flag is 1, the POC information may further include the delta POC MSB cycle LT information. For example, the delta POC MSB cycle LT information may be related to the POC MSB of the long-term reference picture. Also, for example, based on a case in which the POC value of the long-term reference picture may be derived based on at least one of the delta POC MSB cycle presence flag and the delta POC MSB cycle LT information and there are more than one specific POC value in which the remainder obtained by dividing MaxPicOrderCntLsb which is the maximum value of the POC LSB predetermined in the previous picture POC set is the same as the POC LSB of the long-term reference picture, the value of the delta POC MSB cycle presence flag may be limited to 1. Alternatively, for example, based on a case in which the POC value of the long-term reference picture may be derived based on at least one of the delta POC MSB cycle presence flag and the delta POC MSB cycle LT information and there are more than one specific POC value in which the remainder obtained by dividing MaxPicOrderCntLsb which is the maximum value of the POC LSB predetermined in the previous picture POC set is the same as the POC LSB of the long-term reference picture, the value of the delta POC MSB cycle presence flag may be limited to 1.

At this time, according to the embodiment, the previous picture POC set may include the POC value of the previous picture in the decoding order for the current picture, the POC value of each reference picture having the same layer ID as the current picture in the reference picture list for the previous picture, and a POC value of each picture that follows the previous picture and precedes the current picture in decoding order and has the same layer ID as the current picture.

Also, according to an embodiment, the image information may further include layer ID information related to a layer identifier to which the NAL unit belongs. In this case, for example, based on a case in which, with respect to the first picture and the second picture in which the temporal ID (TemporalId) is 0, the layer ID information values are the same, they are not RASL pictures or RADL pictures, the non-reference picture flag value is 0, and the second picture is a first picture whose temporal ID that follows the first picture in output order is 0, the POC difference value between the first picture and the second picture may not be greater than a half value of MaxPicOrderCntLsb which is the maximum value of the predetermined POC LSB.

Also, according to an embodiment, the image information may further include layer ID information related to a layer identifier to which the NAL unit belongs. In this case, for example, based on a case in which, with respect to the first picture and the second picture in which the temporal ID (TemporalId) is 0, there is no picture satisfying a condition in which the layer ID information values are the same, they are not RASL pictures or RADL pictures, the value of the non-reference picture flag is 0 is satisfied and satisfying a condition in which the second picture follows the first picture in output order and follows the first picture and precedes the second picture in output order, the POC difference value between the first picture and the second picture may not be greater than a half value of MaxPicOrderCntLsb which is the maximum value of the predetermined POC LSB.

Also, according to an embodiment, based on a case in which a temporal ID (TemporalId) of a specific picture is 0, the value of the non-reference picture flag for the specific picture may be limited not to be 1.

In the above-described embodiment, the methods are described based on the flowchart having a series of steps or blocks, but this embodiment is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the embodiments of the present disclosure.

The method according to the embodiments of the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the embodiments of the present disclosure are applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the embodiments of the present disclosure are applied may be produced in the form of a computer-executed program, and may be stored in a computer-readable recording medium. The multimedia data having the data structure according to the embodiment(s) of the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment(s) of the present disclosure may be implemented as a computer program product by program code, and the program code may be executed in a computer according to an embodiment(s) of the present disclosure. The program code may be stored on a carrier readable by a computer.

Figure 14:
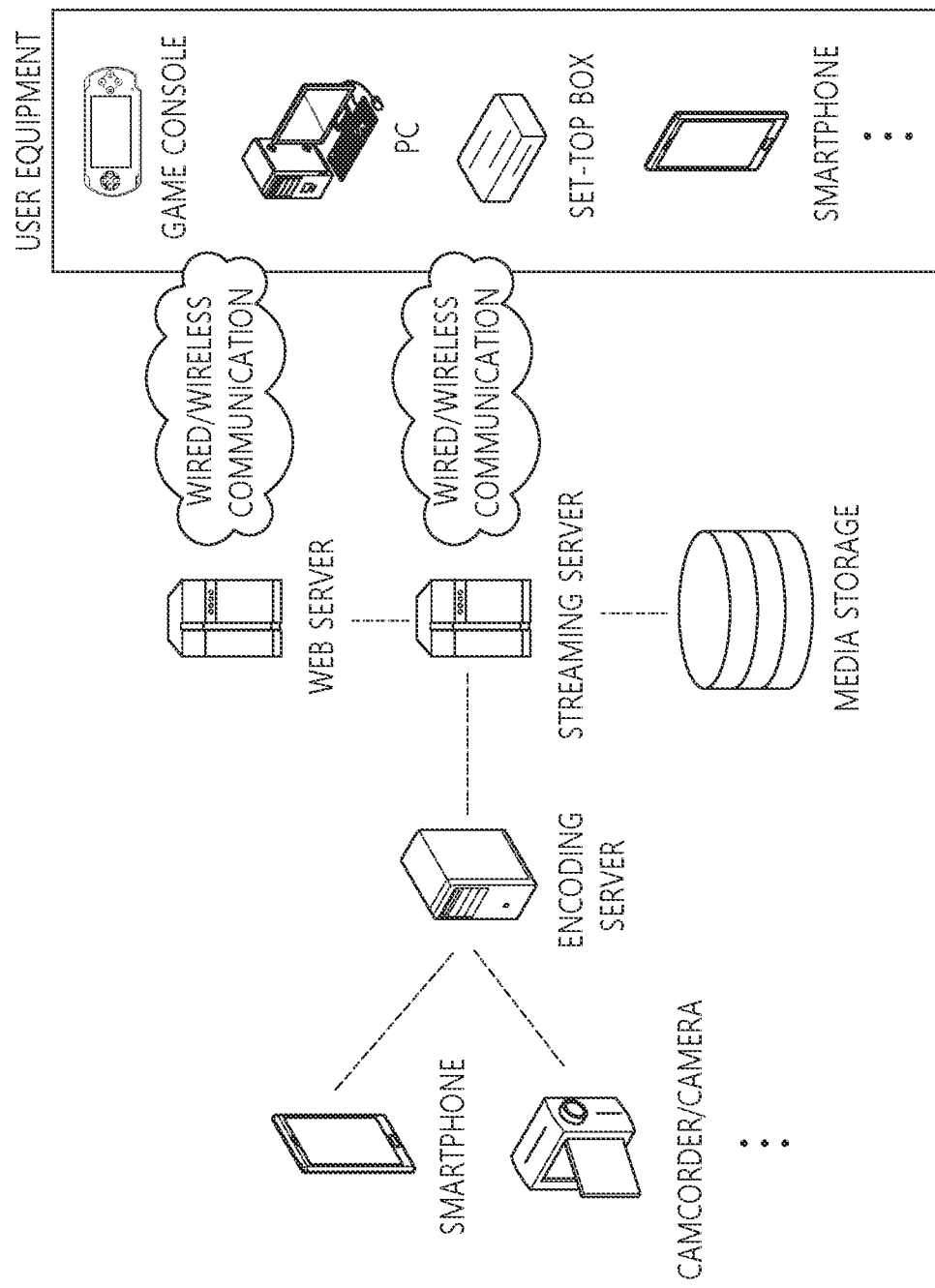
FIG. 14 shows an example of a content streaming system to which embodiments disclosed in the present disclosure may be applied.

FIG. 14 is a diagram illustrating a structure of a content streaming system to which the embodiments of the present disclosure are applied.

Referring to FIG. 14, the content streaming system to which the embodiments of the present disclosure are applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the embodiments of the present disclosure are applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

Claims described in the present disclosure may be combined in various methods. For example, the technical features of method claims of the present disclosure may be combined and implemented as a device, and the technical features of device claims of the present disclosure may be combined and implemented as a method. Further, the technical features of the method claims of the present disclosure and the technical features of the device claims thereof may be combined and implemented as a device, and the technical features of the method claims of the present disclosure and the technical features of the device claims thereof may be combined and implemented as a method.

What is claimed is:

1. An image decoding method performed by a decoding apparatus, the method comprising:
   obtaining image information through a bitstream, wherein the image information includes picture order count (POC) information, and a non-reference picture flag related to whether a picture is not used as a reference picture;
   deriving a POC value of a current picture based on the POC information;
   deriving a POC value of at least one reference picture based on the POC value of the current picture;
   deriving a reference picture list for the current picture based on the POC value of the at least one reference picture;
   performing an inter prediction on the current picture based on the reference picture list; and
   generating a reconstructed picture for the current picture based on the result of the inter prediction,
   wherein the POC information includes POC information of a previous picture in decoding order for the current picture, and the POC value of the current picture is derived based on a POC value of the previous picture in decoding order,
   wherein the previous picture in decoding order for deriving the POC value of the current picture is limited to a picture in which a value of the non-reference picture flag is 0, and
   wherein a POC difference value between the current picture and the previous picture in decoding order for deriving the POC value of the current picture is less than half of MaxPicOrderCntLsb, which is a predetermined maximum value of POC LSB.

2. The method of claim 1,
   wherein the POC information of the previous picture in decoding order for the current picture is related to the POC value of the previous picture modulo MaxPicOrderCntLsb, which is a predetermined maximum value of POC Least Significant Bit (LSB).

3. The method of claim 1,
   wherein the POC information further includes a POC Most Significant Bit (MSB) cycle present flag related to whether POC MSB cycle information of the current picture is present, and
   wherein based on a case that a value of the POC MSB cycle present flag is 0 and the current picture is not a coded layer video sequence start (CLVSS) picture, the POC value of the current picture is derived based on the POC value of the previous picture in decoding order.

4. The method of claim 3,
   wherein the image information further includes layer ID information related to a identifier of a layer to which a NAL unit belongs, and
   wherein the previous picture in decoding order for deriving the POC value of the current picture has the layer ID information equal to layer ID information of the current picture, has a temporal ID equal to 0, has the non-reference picture flag of which value is 0, and is not a RASL (random access skipped leading) or RADL (random access decodable leading) picture.

5. The method of claim 1,
   wherein the POC information further includes a delta POC MSB cycle present flag related to whether delta POC MSB cycle LT (long term) information for a long-term reference picture is present,
   whether based on a case that a value of the delta POC MSB cycle present flag is 1, the POC information further includes the delta POC MSB cycle LT information,
   wherein the delta POC MSB cycle LT information is related to a POC MSB of the long-term reference picture,
   wherein the at least one reference picture includes the long-term reference picture,
   wherein a POC value of the long-term reference picture is derived based on at least one of the delta POC MSB cycle present flag or the delta POC MSB cycle LT information,
   wherein a previous picture POC set is configured based on the previous picture in which the value of the non-reference picture flag is 0, and based on a case that there is more than one specific POC value in the previous picture POC set for which the specific POC value modulo MaxPicOrderCntLsb, which is a predetermined maximum value of POC LSB, is equal to a POC LSB of the long-term reference picture, the value of the delta POC MSB cycle present flag is limited to 1.

6. The method of claim 5,
wherein the previous picture POC set consists of:
the POC value of the previous picture in decoding order for the current picture;
a POC value of each reference picture having layer ID information the same as the current picture in the reference picture list for the previous picture; and
a POC value of each picture that follows the previous picture in decoding order, has the layer ID information the same as the current picture, and precedes the current picture.

7. The method of claim 1,
wherein the image information further includes layer ID information related to a identifier of a layer to which a NAL unit belongs, and
wherein based on a case that values of the layer ID information of a first picture and a second picture with temporal ID equal to 0 are the same, the first picture and the second picture are not RASL picture or RADL picture, values of the non-reference picture flag of the first picture and the second picture are both equal to 0, and the second picture is a first picture with the temporal ID equal to 0 that follows the first picture in output order, a POC difference value between the first picture and the second picture is not greater than half of MaxPicOrderCntLsb, which is a predetermined maximum value of POC LSB.

8. The method of claim 1,
wherein the image information further includes layer ID information related to a identifier of a layer to which a NAL unit belongs,
wherein based on a case that values of the layer ID information of a first picture and a second picture with temporal ID equal to 0 are the same, the first picture and the second picture are not RASL picture or RADL picture, values of the non-reference picture flag of the first picture and the second picture are both equal to 0, the second picture follows the first picture in output order, and there is no picture that satisfies a specific condition, a POC difference value between the first picture and the second picture is not greater than half of MaxPicOrderCntLsb, which is a predetermined maximum value of POC LSB, and
wherein the picture that satisfies the specific condition is a picture that has a temporal ID equal to 0, has the layer ID information the same as the first picture, is not a RASL picture or a RADL picture, follows the first picture in output order but precedes the second picture in output order.

9. The method of claim 1,
wherein based on a case that a temporal ID of a specific picture is equal to 0, the value of the non-reference picture flag for the specific picture is limited to not be 1.

10. An image encoding method performed by an encoding apparatus, the method comprising:
deriving a reference picture list for a current picture;
deriving a picture order count (POC) value of at least one reference picture configuring the reference picture list and a POC value of the current picture; and
encoding image information including POC information and a non-reference picture flag related to whether a picture is not used as a reference picture,
wherein the POC information includes POC information of a previous picture in decoding order for the current picture, and the POC value of the current picture is derived based on a POC value of the previous picture in decoding order,
wherein the previous picture in decoding order for deriving the POC value of the current picture is limited to a picture in which a value of the non-reference picture flag is 0, and
wherein a POC difference value between the current picture and the previous picture in decoding order for deriving the POC value of the current picture is less than half of MaxPicOrderCntLsb, which is a predetermined maximum value of POC LSB.

11. The method of claim 10,
wherein the POC information of the previous picture in decoding order for the current picture is related to the POC value of the previous picture modulo MaxPicOrderCntLsb, which is a predetermined maximum value of POC Least Significant Bit (LSB).

12. The method of claim 10,
wherein the POC information further includes a POC Most Significant Bit (MSB) cycle present flag related to whether POC MSB cycle information of the current picture is present, and
wherein based on a case that a value of the POC MSB cycle present flag is 0 and the current picture is not a coded layer video sequence start (CLVSS) picture, the POC value of the current picture is derived based on the POC value of the previous picture in decoding order.

13. The method of claim 12,
wherein the image information further includes layer ID information related to a identifier of a layer to which a NAL unit belongs, and
wherein the previous picture in decoding order for deriving the POC value of the current picture has the layer ID information equal to layer ID information of the current picture, has a temporal ID equal to 0, has the non-reference picture flag of which value is 0, and is not a RASL (random access skipped leading) or RADL (random access decodable leading) picture.

14. The method of claim 10,
wherein the POC information further includes a delta POC MSB cycle present flag related to whether delta POC MSB cycle LT (long term) information for a long-term reference picture is present,
whether based on a case that a value of the delta POC MSB cycle present flag is 1, the POC information further includes the delta POC MSB cycle LT information,
wherein the delta POC MSB cycle LT information is related to a POC MSB of the long-term reference picture,
wherein the at least one reference picture includes the long-term reference picture,
wherein a POC value of the long-term reference picture is derived based on at least one of the delta POC MSB cycle present flag or the delta POC MSB cycle LT information,
wherein a previous picture POC set is configured based on the previous picture in which the value of the non-reference picture flag is 0, and based on a case that there is more than one specific POC value in the previous picture POC set for which the specific POC value modulo MaxPicOrderCntLsb, which is a predetermined maximum value of POC LSB, is equal to a POC LSB of the long-term reference picture, the value of the delta POC MSB cycle present flag is limited to 1.

15. A method of transmitting a bitstream including image information, the method comprising:
- deriving a reference picture list for a current picture;
- deriving a picture order count (POC) value of at least one reference picture configuring the reference picture list and a POC value of the current picture; and
- encoding the image information including POC information and a non-reference picture flag related to whether a picture is not used as a reference picture; and
- transmitting the bitstream including the image information,
- wherein the POC information includes POC information of a previous picture in decoding order for the current picture, and the POC value of the current picture is derived based on a POC value of the previous picture in decoding order,
- wherein the previous picture in decoding order for deriving the POC value of the current picture is limited to a picture in which a value of the non-reference picture flag is 0, and
- wherein a POC difference value between the current picture and the previous picture in decoding order for deriving the POC value of the current picture is less than half of MaxPicOrderCntLsb, which is a predetermined maximum value of POC LSB.

* * * * *